United States Patent
Park et al.

(10) Patent No.: US 9,425,940 B2
(45) Date of Patent: Aug. 23, 2016

(54) APPARATUS FOR TRANSMITTING AND RECEIVING DOWNLINK CONTROL INFORMATION IN A WIRELESS ACCESS SYSTEM AND METHOD THEREOF

(75) Inventors: Kyujin Park, Anyang-si (KR); Hangyu Cho, Anyang-si (KR); Dongcheol Kim, Anyang-si (KR); Jaehoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 194 days.

(21) Appl. No.: 14/233,275

(22) PCT Filed: Aug. 8, 2012

(86) PCT No.: PCT/KR2012/006305
§ 371 (c)(1),
(2), (4) Date: Jan. 16, 2014

(87) PCT Pub. No.: WO2013/022272
PCT Pub. Date: Feb. 14, 2013

(65) Prior Publication Data
US 2014/0133371 A1    May 15, 2014

Related U.S. Application Data

(60) Provisional application No. 61/522,672, filed on Aug. 11, 2011.

(51) Int. Cl.
*H04L 5/00* (2006.01)
*H04L 5/14* (2006.01)
*H04L 27/26* (2006.01)

(52) U.S. Cl.
CPC ............ *H04L 5/0053* (2013.01); *H04L 5/001* (2013.01); *H04L 5/14* (2013.01); *H04L 27/2633* (2013.01); *H04L 27/2636* (2013.01); *H04L 5/0023* (2013.01); *H04L 5/0044* (2013.01); *H04L 5/0048* (2013.01); *H04L 5/1469* (2013.01)

(58) Field of Classification Search
None
See application file for complete search history.

(56) References Cited

U.S. PATENT DOCUMENTS

| | | | | |
|---|---|---|---|---|
| 2010/0290376 A1* | 11/2010 | Dai | ........ | H04L 5/0007 370/294 |
| 2010/0309826 A1* | 12/2010 | Dai | ........ | H04L 1/1671 370/280 |
| 2011/0096702 A1* | 4/2011 | Dai | ........ | H04L 5/0007 370/294 |
| 2011/0128872 A1* | 6/2011 | Lindoff | ........ | H04J 11/0069 370/252 |
| 2011/0243107 A1* | 10/2011 | Koivisto | ........ | H04W 72/1215 370/336 |
| 2011/0261716 A1* | 10/2011 | Kim | ........ | H04B 7/0671 370/252 |

(Continued)

OTHER PUBLICATIONS

3GPP TSG RAN WG1 Meeting #60, R1-101207, "Views on details of CIF", San Francisco, CA, Feb. 22-26, 2010.

(Continued)

*Primary Examiner* — Jenee Williams
(74) *Attorney, Agent, or Firm* — Dentons US LLP

(57) ABSTRACT

Disclosed are an apparatus for transmitting and receiving downlink control information in a TDD (time division duplex) wireless access system and method thereof. The present invention includes performing a blind decoding on a transmitting region of e-PDCCH (enhanced physical downlink control channel) transmitted by being multiplexed with PDSCH (physical downlink shared channel) and receiving the DCI through the blind decoding of the e-PDCCH. In particular, a last symbol of the transmitting region of the e-PDCCH in a special subframe is configured in accordance with a configuration of the special subframe.

6 Claims, 25 Drawing Sheets

(56) References Cited

U.S. PATENT DOCUMENTS

| | | | | |
|---|---|---|---|---|
| 2012/0033603 | A1* | 2/2012 | Seo | H04L 5/001 370/312 |
| 2012/0106465 | A1* | 5/2012 | Haghighat | H04W 72/1289 370/329 |
| 2012/0329400 | A1* | 12/2012 | Seo | H04J 11/005 455/63.1 |
| 2013/0039284 | A1* | 2/2013 | Marinier | H04L 5/001 370/329 |
| 2013/0114560 | A1* | 5/2013 | Liu | H04L 1/0026 370/329 |
| 2013/0114565 | A1* | 5/2013 | Chen | H04L 5/0053 370/330 |
| 2013/0170387 | A1* | 7/2013 | Wang | H04W 4/005 370/252 |
| 2013/0194931 | A1* | 8/2013 | Lee | H04L 5/0053 370/241 |
| 2013/0301597 | A1* | 11/2013 | Kim | H04W 72/042 370/329 |
| 2014/0112280 | A1* | 4/2014 | Lee | H04W 72/04 370/329 |
| 2015/0215905 | A1* | 7/2015 | Park | H04B 7/0473 370/329 |

OTHER PUBLICATIONS

3GPP TSG RAN WG1 Meeting #65, R1-111636, "DL Control Channel Enhancement for DL MIMO in Rel-11", Barcelona, Spain, May 9-13, 2011.

3GPP TSG RAN WG1 Meeting #60bis, R1-102290, "UE-Specific Search Space and Blind Decoding for Carrier Aggregation", Beijing, China, Apr. 12-16, 2010.

3GPP TSG RAN WG1 Meeting #61, R1-103245, "UE-Specific Search Space for Carrier Aggregation", May 10-14, 2010.

3GPP TSG RAN WG1 Meeting #65, R1-111789, "Discussions on DL Control Signaling Enhancement", Barcelona, Spain, May 9-13, 2011.

* cited by examiner

FIG. 16
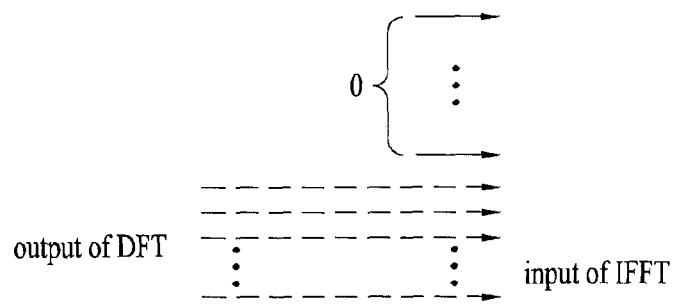
(a)
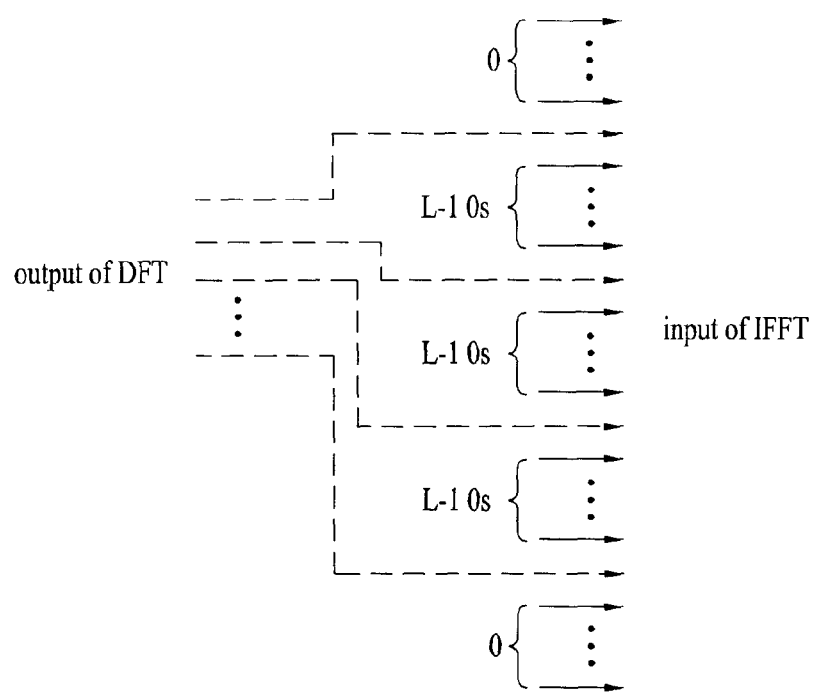
(b)

APPARATUS FOR TRANSMITTING AND RECEIVING DOWNLINK CONTROL INFORMATION IN A WIRELESS ACCESS SYSTEM AND METHOD THEREOF

This application is a 35 USC §371 National Stage entry of International Application No. PCT/KR2012/006305, filed on Aug. 8, 2012, and claims priority of U.S. Provisional Application No. 61/522,672 filed Aug. 11, 2011 which are each hereby incorporated by reference in its entirety.

TECHNICAL FIELD

The present invention relates to a wireless communication system, and more particularly, to an apparatus for transmitting and receiving downlink control information in a TDD (time division duplex) wireless access system and method thereof.

BACKGROUND ART

Mobile communication system has been developed to provide an audio service by securing user's activity and mobility. The ongoing trend of the mobile communication system is to extend its service capability to a data service as well as the audio service. Currently, the development of the mobile communication system enables a high-speed data service. Yet, since a currently serviced mobile communication system causes resource shortage and fails in meeting user's request for a faster service, the demand for a further advanced mobile communication system is rising.

One of the most significant requirements for the next generation wireless access system is the capability of supporting the high data rate requisite. To this end, many on going efforts are made to research and develop various technologies including MIMO (multiple input multiple output), CoMP (cooperative multiple point transmission), relay and the like.

In order for these technologies to obtain best performance, it may be difficult to use the same downlink control channels used by legacy systems. To settle this difficulty, an enhanced physical downlink control channel (e-PDCCH) is introduced into 3GPP LTE-A system to increase capacity of a physical downlink control channel (PDCCH) of the legacy 3GPP LTE system.

DISCLOSURE OF THE INVENTION

Technical Problem

However, in an e-PDCCH supportive TDD (time division duplex) wireless access system, a method of transmitting downlink control channel in a special subframe or on an extension component carrier (CC), on which PDCCH is not carried, except a backward compatible component carrier (CC) compatible with a legacy system may raise an issue.

Technical Solution

Accordingly, the present invention is directed to an apparatus for transmitting and receiving downlink control information in a TDD (time division duplex) wireless access system and method thereof that substantially obviate one or more of the problems due to limitations and disadvantages of the related art.

An object of the present invention is to provide an apparatus for efficiently transmitting and receiving downlink control information between a user equipment and a base station in a TDD wireless access system and method thereof.

Another object of the present invention is to provide an apparatus for transmitting an enhanced physical downlink control channel in a TDD special subframe and method thereof.

A further object of the present invention is to provide an apparatus for transmitting and receiving an enhanced physical downlink control channel on an extension component carrier (CC) in a CA (carrier aggregation) supportive wireless access system.

Technical tasks obtainable from the present invention are non-limited the above-mentioned technical task. And, other unmentioned technical tasks can be clearly understood from the following description by those having ordinary skill in the technical field to which the present invention pertains.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of receiving DCI (downlink control information) in a TDD (time division duplex) wireless access system, according to one of the present invention may include the steps of performing a blind decoding on a transmitting region of e-PDCCH (enhanced physical downlink control channel) transmitted by being multiplexed with PDSCH (physical downlink shared channel) and receiving the DCI through the blind decoding of the e-PDCCH, wherein a last symbol of the transmitting region of the e-PDCCH in a special subframe is configured in accordance with a configuration of the special subframe.

To further achieve these and other advantages and in accordance with the purpose of the present invention, a user equipment, which receives DCI (downlink control information) in a TDD (time division duplex) wireless access system, according to another embodiment of the present invention may include an RF (radio frequency) unit configured to transceive a radio signal and a processor performing a blind decoding on a transmitting region of e-PDCCH (enhanced physical downlink control channel) transmitted by being multiplexed with PDSCH (physical downlink shared channel), the processor receiving the DCI through the blind decoding of the e-PDCCH, wherein a last symbol of the transmitting region of the e-PDCCH in a special subframe is configured in accordance with a configuration of the special subframe.

Preferably, the last symbol of the transmitting region of the e-PDCCH in the special subframe may be configured to a last symbol of DwPTS (downlink pilot time slot) in accordance with the configuration of the special subframe.

Preferably, if the configuration of the special subframe sets 1 to 4 and 6 to 8, the last symbol of the transmitting region of the e-PDCCH in the special subframe may be configured to a last symbol belonging to a $1^{st}$ slot of the special subframe.

Preferably, the DCI may be transmitted on an extension component carrier in a carrier aggregation supportive wireless access system.

More preferably, in case of the special subframe, the DCI may be transmitted on PDCCH (physical downlink control channel) or e-PDCCH of a component carrier performing cross carrier scheduling.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, according to an embodiment of the present invention, downlink control information can be efficiently transceived between a user equipment and a base station in a TDD wireless access system.

Secondly, according to an embodiment of the present invention, an enhanced physical downlink control channel can be efficiently transceived in a special subframe of a TDD wireless access system.

Thirdly, according to an embodiment of the present invention, an enhanced physical downlink control channel can be efficiently transceived on an extension component carrier (CC) of a CA (carrier aggregation) wireless access system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 16 is a diagram for describing a signal mapping scheme in frequency domain to meet a single carrier property in the frequency domain.

BEST MODE

Mode for Invention

Figure 1:
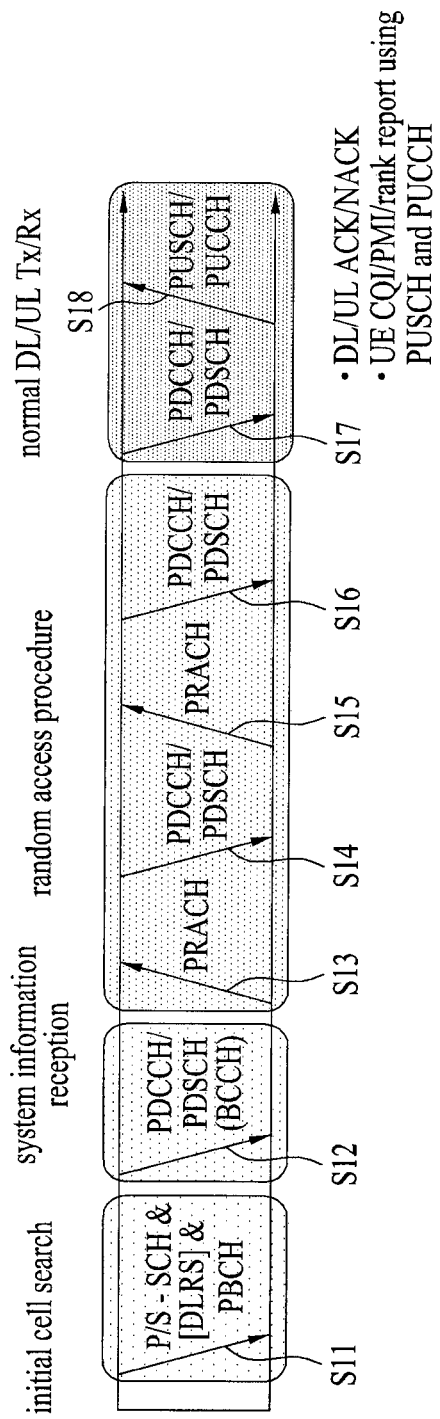
FIG. 1 is a diagram for explaining physical channels used for 3GPP system and a signal transmission using the same.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

1. 3GPP LTE/LTE-A System to which the Present Invention is Applicable 1. 1. The General of System FIG. 1 is a diagram for explaining physical channels used for 3GPP system and a signal transmission using the same.

Referring to FIG. 1, if a power of a user equipment is turned on or the user equipment enters a new cell, the user equipment may perform an initial cell search job for matching synchronization with a base station and the like [S11]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S12].

Meanwhile, the user equipment may be able to perform a random access procedure to complete the access to the base station [S13 to S16]. To this end, the user equipment may transmit a specific sequence as a preamble via a physical random access channel (PRACH) [S13] and may be then able to receive a response message via PDCCH and a corresponding PDSCH in response to the random access [S14]. In case of a contention based random access, it may be able to perform a contention resolution procedure such as a transmission S15 of an additional physical random access channel and a channel reception S16 of a physical downlink control channel and a corresponding physical downlink shared channel.

Having performed the above mentioned procedures, the user equipment may be able to perform a PDCCH/PDSCH reception S17 and a PUSCH/PUCCH (physical uplink shared channel/physical uplink control channel) transmission S18 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
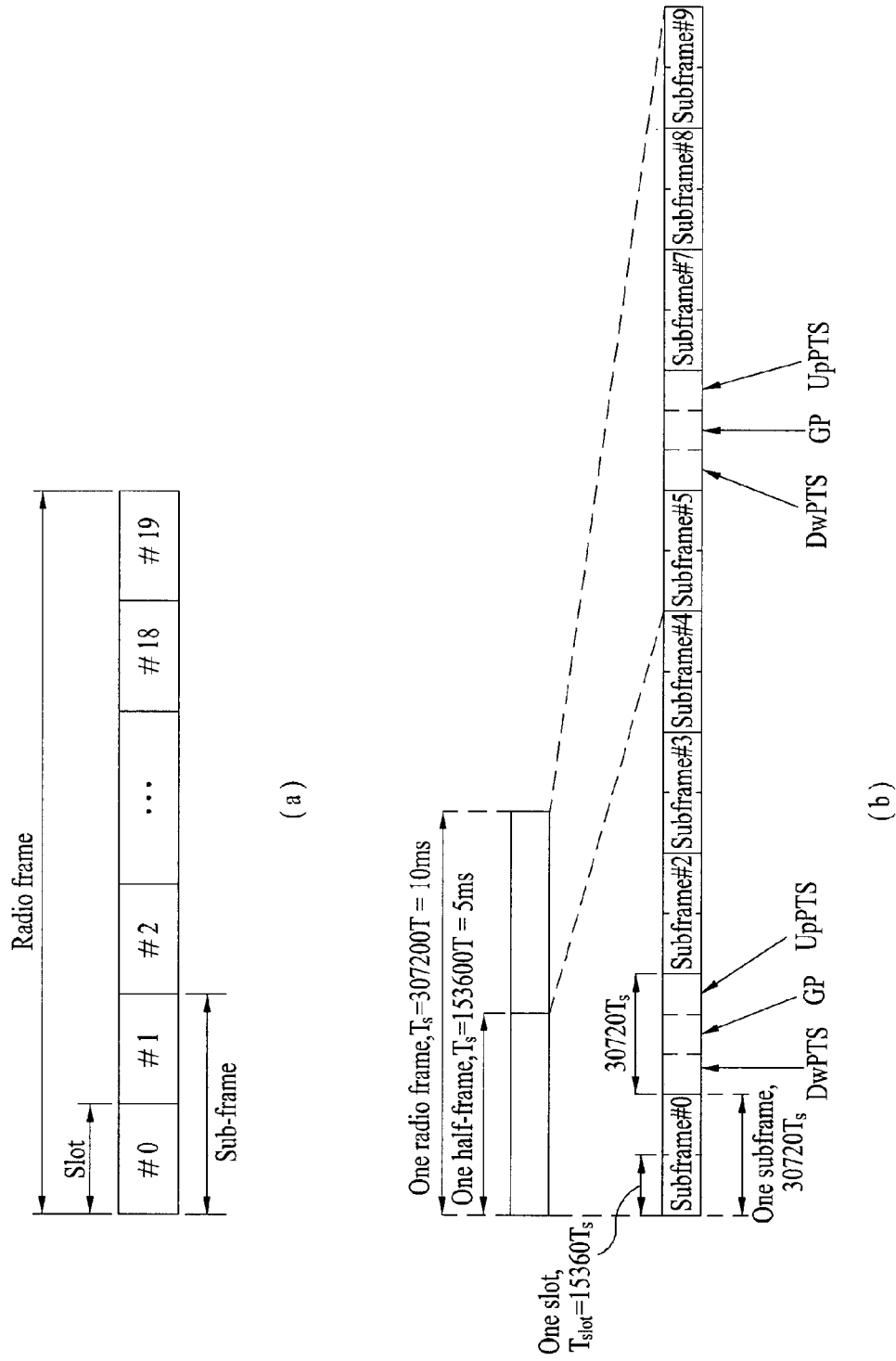
FIG. 2 is a diagram for a structure of a radio frame in 3GPP LTE.

FIG. 2 shows structures of radio frames in 3GPP LTE.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (a) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP system uses OFDMA in downlink, OFDM symbol is provided to indicate one symbol period. The OFDM symbol may be named SC-FDMA symbol or symbol period. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2 (b) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
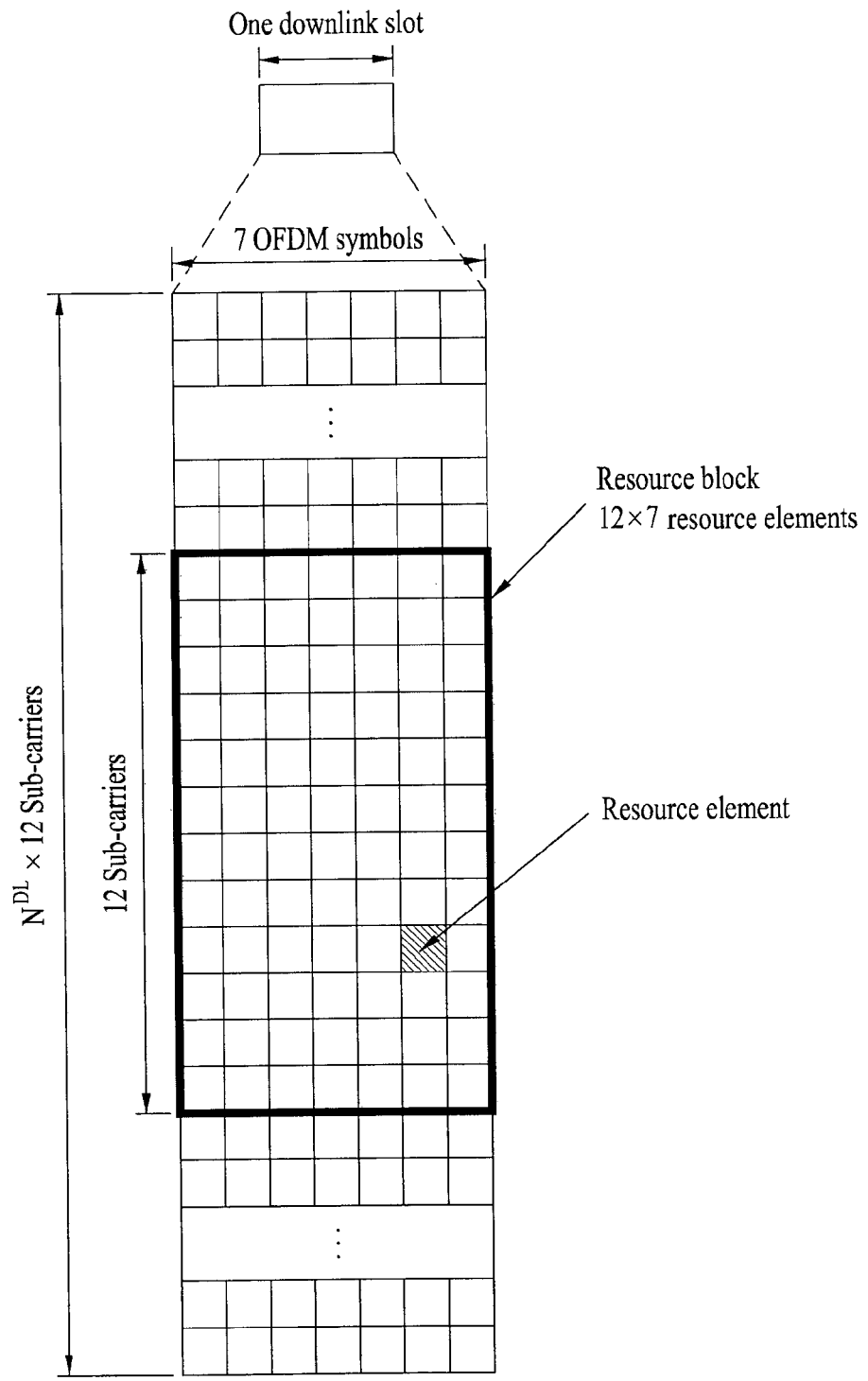
FIG. 3 is a diagram for one example of a resource grid for a downlink slot.

FIG. 3 is a diagram for one example of a resource grid for a downlink (DL) slot.

Referring to FIG. 3, one downlink (DL) slot may include a plurality of OFDM symbols in time domain. In particular, one DL slot exemplarily includes 7 OFDM symbols and one resource block (RB) exemplarily includes 12 subcarriers in frequency domain, by which the present invention may be non-limited.

Each element on a resource grid is called a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
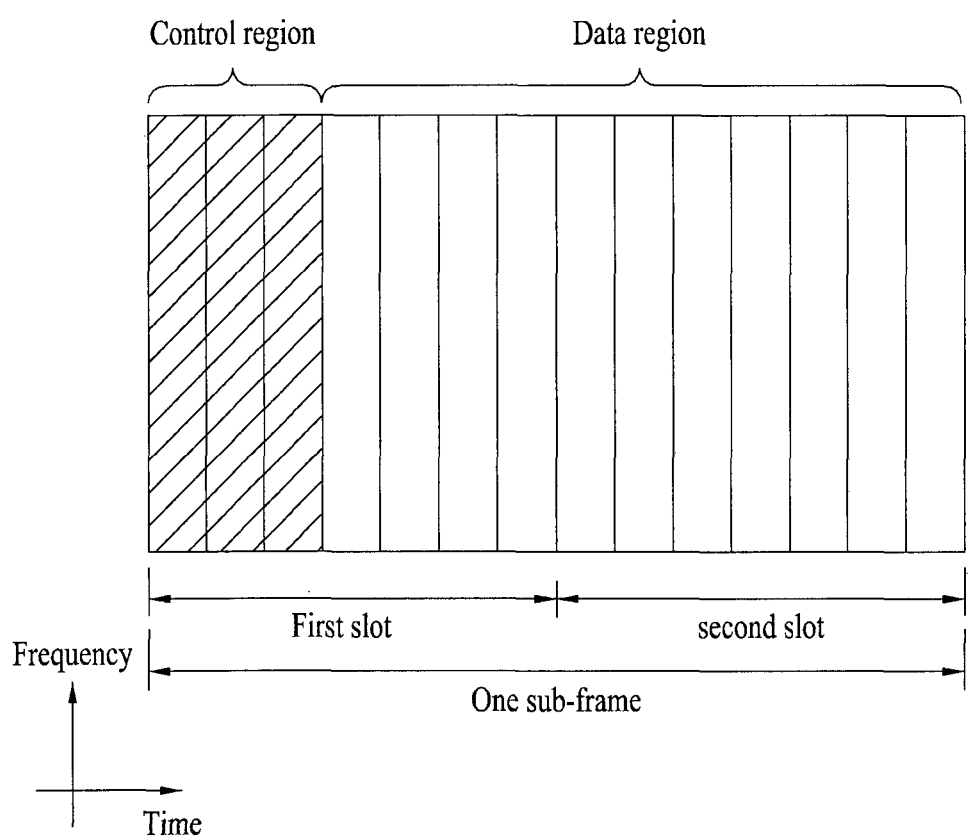
FIG. 4 is a diagram for a structure of a downlink subframe.

FIG. 4 is a diagram for a structure of a downlink (DL) subframe. Maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols used for a transmission of a control channel within the subframe. The PHICH is a response channel in response to UL and carries ACK/NACK (acknowledgement/non-acknowledgement) signal for HARQ (hybrid automatic repeat request). Control information carried on PDCCH may be called downlink control information (hereinafter abbreviated DCI). The DCI may include UL resource allocation information, DL resource allocation information or a UL transmission (Tx) power control command for a random UE (user equipment) group.

Figure 5:
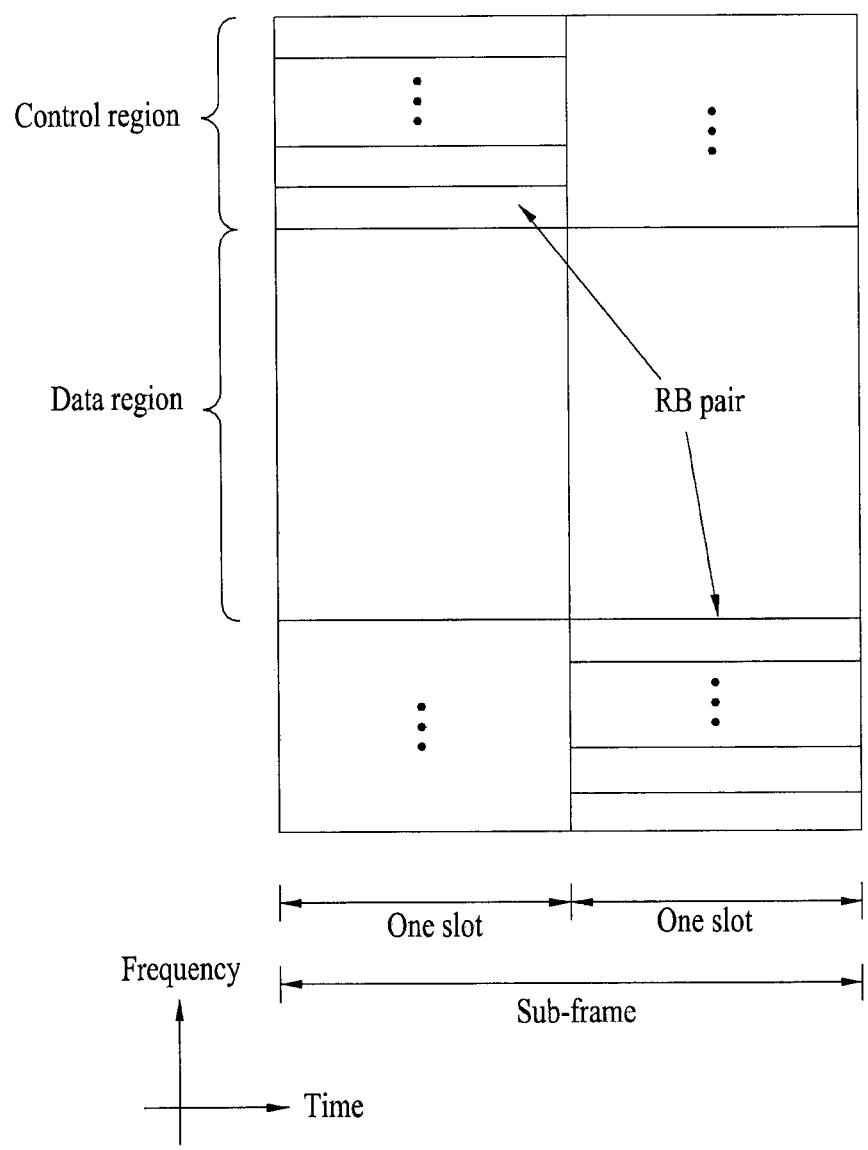
FIG. 5 is a diagram for a structure of an uplink subframe.

FIG. 5 is a diagram for a structure of an uplink (UL) subframe.

Referring to FIG. 5, a UL subframe may be divided into a control region and a data region in frequency domain. A physical UL control channel (PUCCH), which carries UL control information, is allocated to the control region. And, a physical UL shared channel (PUSCH), which carries user data, is allocated to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

Figure 6:
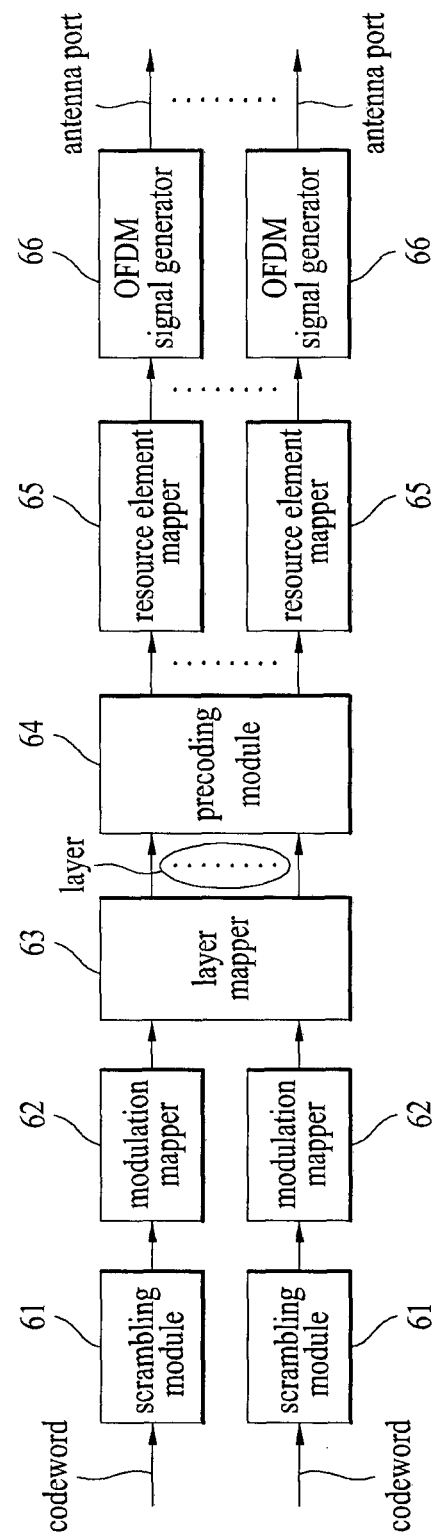
FIG. 6 is a diagram for describing a signal processing process for a base station to transmit a DL signal.

FIG. 6 is a diagram for describing a signal processing process for a base station to transmit a DL signal.

In 3GPP LTE system, a base station may be able to transmit at least one codeword in DL. Hence, each of the at least one codeword can be processed into a complex symbol by a scrambling module 61 and a modulating mapper 62. The complex symbol may be then mapped to a plurality of layers by a layer mapper 63. Each of a plurality of the layers may be then assigned to each transmitting antenna by being multiplied by a prescribed precoding matrix selected by a precoding module 64 in accordance with a channel state. A per-antenna transmission signal processed in the above manner is mapped to a time-frequency resource element by each resource element mapper 65, enters an OFDM (orthogonal frequency division multiple access) signal generator 66, and may be then transmitted via a corresponding antenna.

Figure 7:
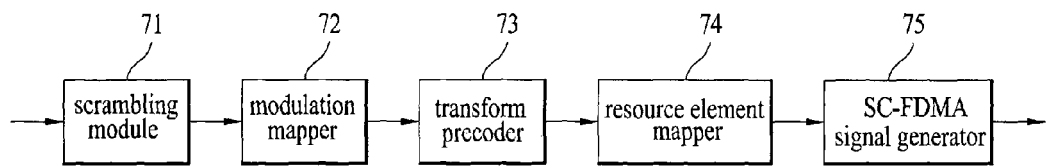
FIG. 7 is a diagram for describing a signal processing process for a user equipment to transmit a UL signal.

FIG. 7 is a diagram for describing a signal processing process for a user equipment to transmit a UL signal.

First of all, in order to transmit a UL signal, a scrambling module 71 of a user equipment may be able to scramble a transmission signal using a UE-specific scrambling signal. This scrambled signal is inputted to a modulating mapper 72 and is then modulated into a complex symbol by BPSK (binary phase shift keying), QPSK (quadrature phase shift keying) or 16 QAM (quadrature amplitude modulation) in accordance with a type and/or channel state of the transmission signal. Subsequently, the complex symbol is processed by a transform precoder 73 and is then inputted to a resource element mapper 74. In this case, the resource element mapper 74 may be able to map the complex symbol to a time-frequency resource element. This processed signal is inputted to an SC-FDMA signal generator and may be then transmitted to a base station via antenna.

Since the OFDM scheme uses multiple subcarriers, it may be disadvantageous in that PAPR (peak to average power ratio) is relatively high due to overlapping between subcarriers. Therefore, in order to compensate for the disadvantage of the high PAPR in a ser equipment for which power efficiency is important, as mentioned in the foregoing description with reference to FIG. 6 and FIG. 7, OFDMA scheme and SC-FDMA (single carrier-frequency division multiple access) scheme are used for a DL signal transmission and a UL signal transmission in 3GPP system (e.g., LTE system), respectively. The SC-FDMA scheme may be called DFTs OFDM (discrete Fourier transform-spread OFDM).

1. 2. Downlink System

Since data/signal is transmitted on a radio channel in a wireless communication system, the data/signal may be distorted in radio in the course of transmission. In order for a receiving end to correctly receive a distorted signal, it may be preferable that the distorted and received signal is corrected using channel information. In doing so, a transmitting state and/or a receiving end may be able to use a reference signal known to both of the ends. In this case, the reference signal may be called a pilot signal.

When a receiving end transmits and receives data using MIMO antenna, it may be preferable that a channel state between a transmitting antenna and a receiving antenna is detected in order for a receiving end of correctly receive the data. In dong so, in order for the receiving end to detect the channel state, each transmitting antenna of the transmitting end may preferably have an individual reference signal.

DL reference signals are classified into a common reference signal (CRS) shared by all user equipments in one cell and a dedicated reference signal (DRS) for a specific user equipment only. The transmitting end may be able to provide the receiving end with information for demodulation and channel measurement using these reference signals (i.e., CRS and DRS).

The receiving end (e.g., a user equipment) measures a channel state using the CRS and may be then able to feed back such an indicator related to a channel equality as a channel quality indicator (CQI), a precoding matrix index (PMI), a rank indicator (RI) and the like to the transmitting end (e.g. a base station) in response to the measured channel state. In the embodiments of the present invention, CRS may be named a cell-specific reference signal (cell-specific RS). On the other hand, a reference signal related to a feedback of channel state information (CSI) may be defined as CSI-RS.

DRS can be transmitted to user equipments via resource elements if data demodulation on PDSCH is required. A user equipment may be able to receive a presence or non-presence of DRS through upper layer signaling. The DRS is effective only if mapped by a corresponding PDSCH signal. In the embodiments of the present invention, DRS may be called a user equipment-specific reference signal (UE-specific RS) or a demodulation reference signal (DMRS).

Figure 8:
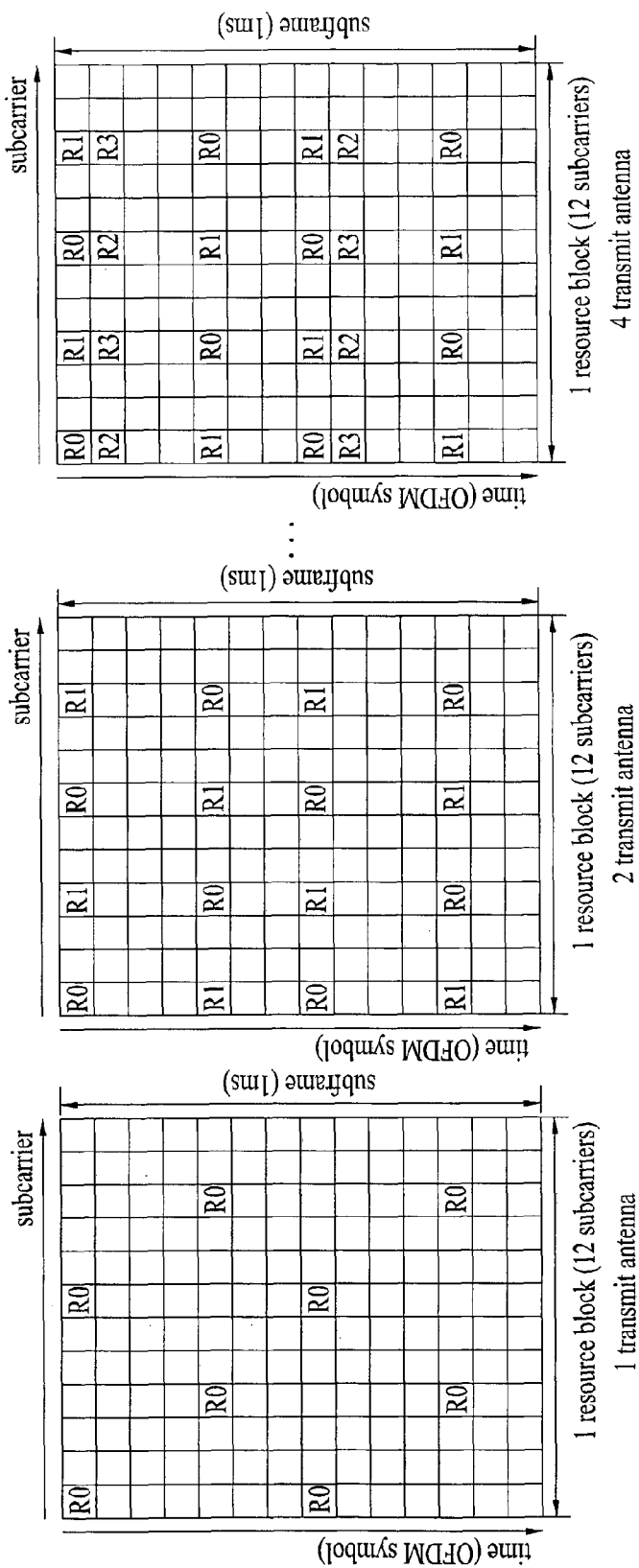
FIG. 8 is a diagram for one example of a DL reference signal structure for a system having 1, 2 or 4 transmitting (Tx) antennas.

FIG. 8 is a diagram for one example of a DL reference signal structure for a system having 1, 2 or 4 transmitting (Tx) antennas.

Referring to FIG. 8, R0, R1, R2 and R3 indicate a reference signal for a transmitting antenna 0, a reference signal for a transmitting antenna 1, a reference signal for a transmitting antenna 2, and a reference signal for a transmitting antenna 3, respectively. In order to eliminate interference in-between, signals for the rest of the transmitting antennas except the transmitting antenna for transmitting the corresponding reference signal are not transmitted on the subcarrier used by the reference signal of each of the transmitting antennas.

Figure 9:
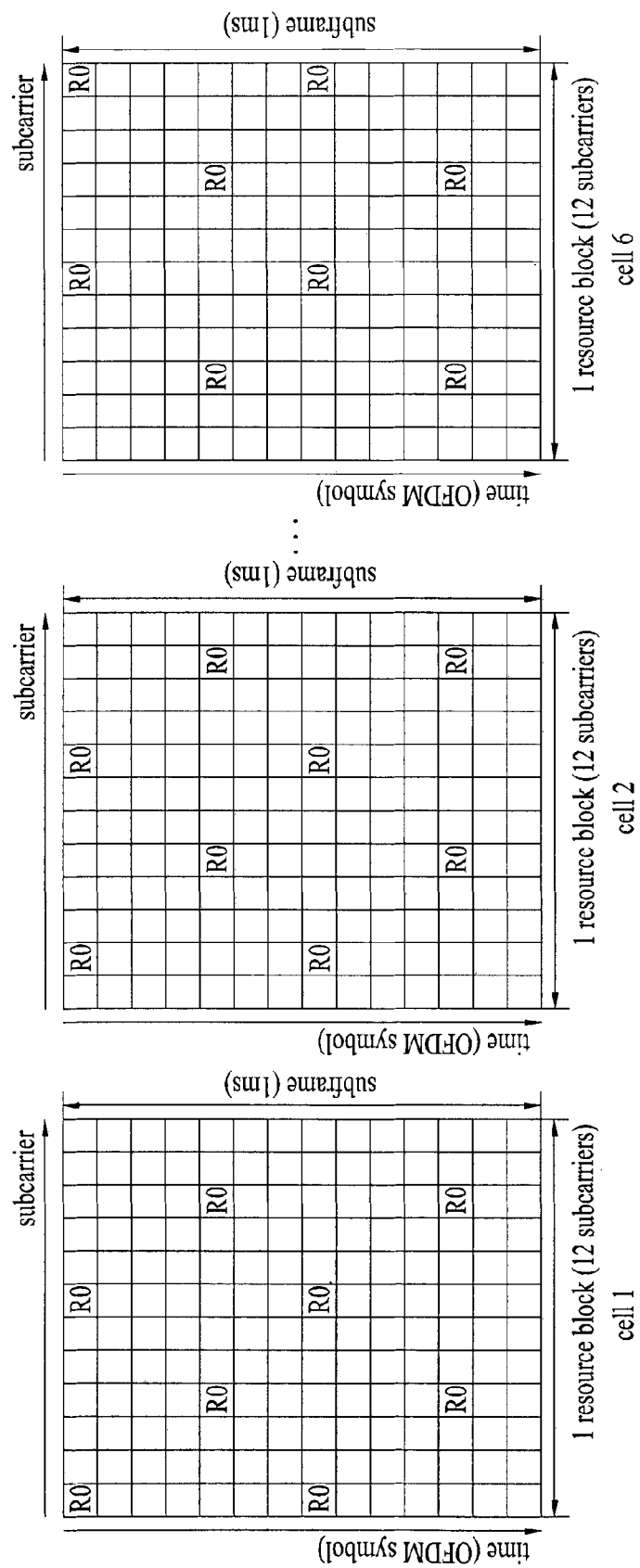
FIG. 9 is a diagram for one example of a DL reference signal attributed to a frequency shift of a reference signal in accordance with a cell in case of a normal cyclic prefix.

FIG. 9 is a diagram for one example of a DL reference signal attributed to a frequency shift of a reference signal in accordance with a cell in case of a normal cyclic prefix.

Referring to FIG. 9, assuming that a structure of a reference signal (or a pilot symbol) for a system having a single transmitting antenna shown in FIG. 8 is used for a cell 1 shown in FIG. 9, it may be able to protect a reference signal through a shift by a subcarrier/OFDM symbol unit in frequency/time domain in order to avoid inter-cell reference signal collision in a cell 2 or cell 3. For instance, in case of a system having a single transmitting antenna, as shown in FIG. 9, each reference signal may be situated in an interval of 6 subcarriers in frequency domain. Hence, at least 5 adjacent cells may enable reference signals to be situated at different positions in frequency domain through the transmission by the subcarrier unit in the frequency domain.

In addition, interference of a reference signal received by a receiver from an adjacent cell is reduced in a manner of transmitting a DL reference signal multiplied by a pseudo-random (PN) sequence, whereby channel estimation performance can be enhanced. This PN sequence is applied by an OFDM symbol unit in a single subframe. And, the PN sequence may be differently applicable in accordance with a cell identifier (ID), a subframe number (or index) and an OFDM symbol position.

Figure 10:
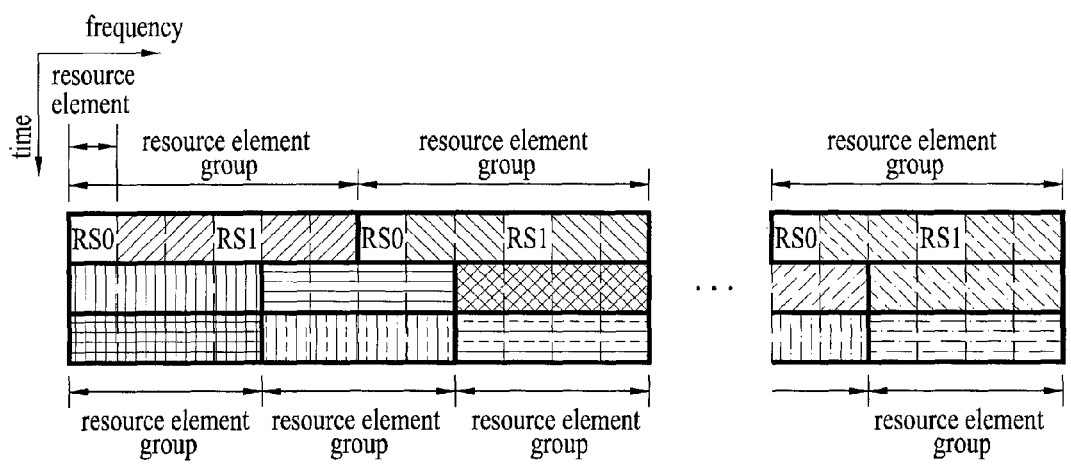
FIG. 10 is a diagram for one example of a resource configuration of a DL control channel in a system having 1 or 2 transmitting (Tx) antennas.
Figure 11:
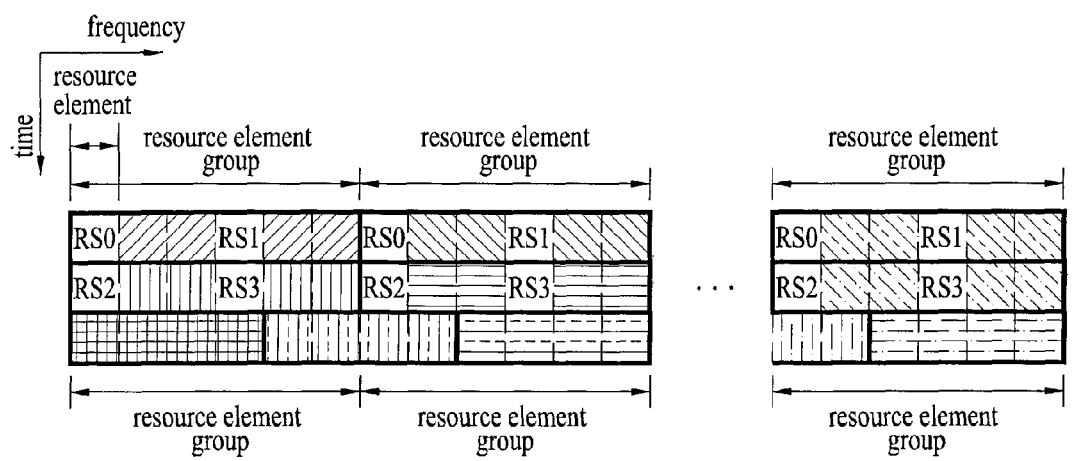
FIG. 11 is a diagram for one example of a resource configuration of a DL control channel in a system having 4 transmitting (Tx) antennas.

In order to allocate the above-mentioned DL control channel to each subframe, it may be able to configure such resources as shown in FIG. 10 and FIG. 11.

FIG. 10 is a diagram for one example of a resource configuration of a DL control channel in a system having 1 or 2 transmitting (Tx) antennas. And, FIG. 11 is a diagram for one example of a resource configuration of a DL control channel in a system having 4 transmitting (Tx) antennas. In FIG. 10 and FIG. 11, R0, R1, R2 and R3 indicate a reference signal for a transmitting antenna 0, a reference signal for a transmitting antenna 1, a reference signal for a transmitting antenna 2, and a reference signal for a transmitting antenna 3, respectively.

Referring to FIG. 10 and FIG. 11, a basic resource configuration of a DL control channel includes a resource element group (REG). The REG is used to define the mapping of a control channel to a resource element. And, the REG may include 4 contiguous resource elements in frequency domain except a resource element used for a transmission of a reference signal. Under certain circumstances, a specific number of REGs may be used as a DL control channel. In doing so, a resource element is used as a single subcarrier.

In the following description, PCFICH is explained in detail.

First of all, PCFICH is transmitted on a $1^{st}$ OFDM symbol (i.e., OFDM symbol #0) in each subframe. The PCFICH may be transmitted via a single antenna. Alternatively, the PCFICH may be transmitted by applying transmit diversity scheme. When a user equipment receives a subframe, the user equipment checks control information carried on the PCFICH and then receives control information carried on PDCCH.

A base station transmits PDCCH between OFDM symbols #0 to #2 in each subframe for resource allocation information of each subframe and the like and may be able to send DL control information carried on OFDM symbol #0, OFDM symbols #1 and #2, or OFDM symbols #0 to #2 in accordance with a size of a DL control channel. Thus, the number of OFDM symbols used by the DL control channel is changeable, of which information is indicated by the PCFICH. Therefore, the PCFICH should be transmitted in each subframe.

Control information carried on PCFICH is called a control format indicator (CFI). For instance, a value of the CFI may be set to 1, 2 or 3. And, the CFI value may be able to indicate the number of OFDM symbols used for PDCCH transmission in a subframe. This is just exemplary. And, information indicated by the CFI may be defined differently in accordance with a system bandwidth. For instance, in case that a bandwidth of a system is smaller than a specific threshold value, the CFI value set to 1 indicates that the number of OFDM symbols used for a PDCCH transmission in each subframe is 2, the CFI value set to 2 indicates that the number of OFDM symbols used for a PDCCH transmission in each subframe is 3, or the CFI value set to 3 indicates that the number of OFDM symbols used for a PDCCH transmission in each subframe is 4.

Table 1 shows one example of CFI of PCFICH and 32-bit CFI codeword generated from performing channel coding on the CFI.

TABLE 1

| CFI | CFI codeword $< b_0, b_1, \ldots, b_{31} >$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Referring to Table 1, if CFI=1, it indicates that PDCCH is transmitted on $0^{th}$ OFDM symbol only. If CFI=2, it indicates that PDCCH is transmitted on $0^{th}$ and $1^{st}$ OFDM symbols. If CFI=3, it indicates that PDCCH is transmitted on $0^{th}$ to $2^{nd}$ OFDM symbols.

It may be able to modulate CFI codeword using QPSK (quadrature phase shift keying) scheme. In this case, 32-bit codeword can be modulated into 16 symbols. Hence, 16 subcarriers are used for a PCFICH transmission.

Figure 12:
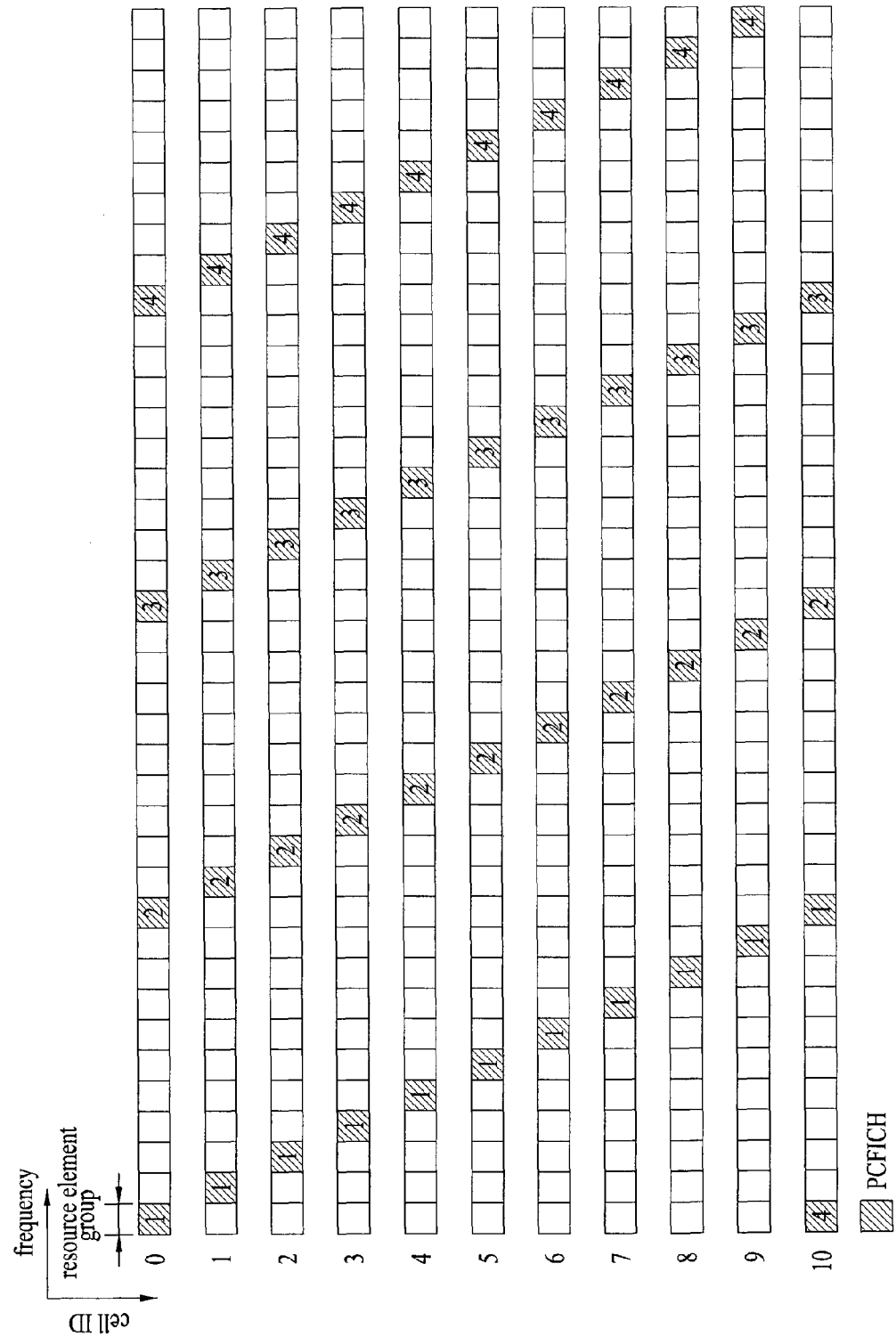
FIG. 12 is a diagram for one example of a transmission type of PCFICH.

FIG. 12 is a diagram for one example of a transmission type of PCFICH.

Referring to FIG. 12, REG includes 4 subcarriers, and more particularly, data subcarriers except a reference signal. As mentioned in the foregoing description, since 16 subcarriers are used for a PCFICH transmission, 4 REGs may be usable for the PCFICH transmission. The REG mapped by PCFICH may vary in accordance with the number of resource blocks in frequency domain. In order to prevent inter-cell interference, the REG mapped by the PCFICH may be shifted in frequency domain in accordance with a cell ID. Since the PCFICH is transmitted on a $1^{st}$ OFDM symbol of a subframe all the time, if a receiver receives the subframe, the receiver preferentially checks information of the PCFICH and then receives information of PDCCH.

In the following description, PHICH is explained in detail.

First of all, PHICH is a channel that carries ACK/NACK information on a DL data channel. In particular, a plurality of PHICHs form a single PHICH group and are then mapped to the same REG. The PHICHs in the PHICH group may be discriminated from each other by different sequences, respectively. For instance, it may be able to use sequences orthogonal to each other. One PHICH group may include PHICHs for a plurality of user equipments. And, a plurality of PHICH groups can be formed within one subframe. For instance, ACK/NACK information carried on PHICH is repeated three times and spread four times, thereby forming 12 symbols. In this case, 3 REGs may be usable for the PHICH transmission.

Figure 13:
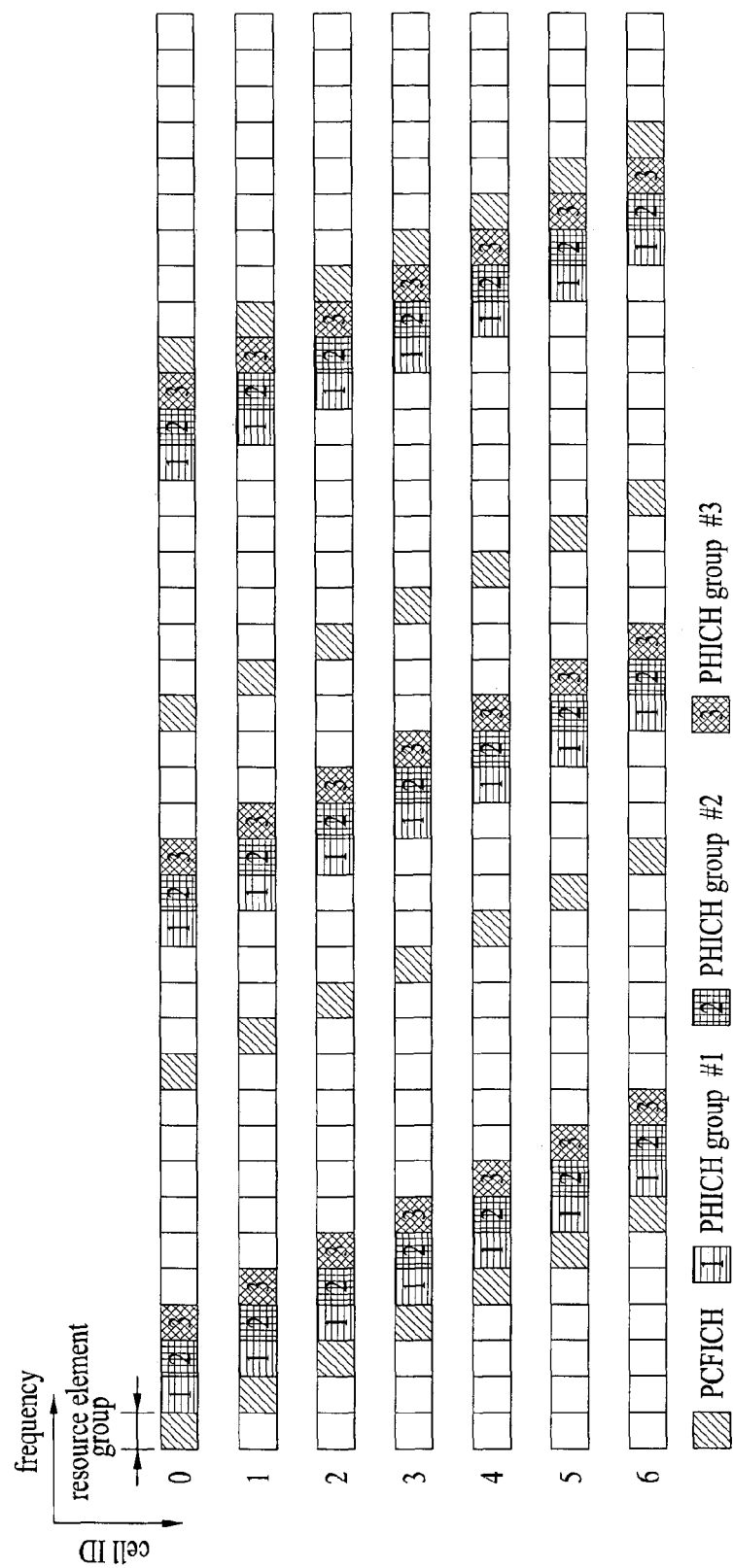
FIG. 13 is a diagram for one example of mapping PCIFH and PHICH to REG.

FIG. 13 is a diagram for one example of mapping PCIFH and PHICH to REG.

Referring to FIG. 13, 3 PHICH groups are exemplarily shown. Each of the PHICH groups is mapped to REG not mapped by PCFICH. Each of the PHICH groups is transmitted on 3 REGs. The REG mapped by each of the PHICH groups is shifted in frequency domain in accordance with cell ID to prevent inter-cell interference.

PHICH allocation for each user equipment in several PHICH groups is performed using a lowest PRB (physical resource block) index of a PUSCH resource allocation and a frequency shift (cyclic shift) of a demodulation reference signal (DMRS) transmitted by uplink grant. The PHICH resource is known as such an index pair as ($n_{PHICH}^{group}$, $n_{PHICH}^{seq}$). In this case, $n_{PHICH}^{group}$ and $n_{PHICH}^{seq}$ in the index pair ($n_{PHICH}^{group}$, $n_{PHICH}^{seq}$) indicate a PHICH group number and an orthogonal sequence index in the corresponding PHICH group.

Table 2 shows one example of an orthogonal sequence used by 3GPP LTE system.

TABLE 2

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 +1 −1 −1] | [+1 −1] |
| 2 | [+1 −1 −1 +1] | [+j +j] |
| 3 | [+1 −1 +1 −1] | [+j −j] |
| 4 | [+j +j +j +j] | — |
| 5 | [+j −j +j −j] | — |
| 6 | [+j +j −j −j] | — |
| 7 | [+j −j −j +j] | — |

The above-mentioned $n_{PHICH}^{group}$ and $n_{PHICH}^{seq}$ may be found by Formula 1 in the following.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$ [Formula 1]

In Formula 1, $n_{DMRS}$ indicates a frequency shift (cyclic shift) of DMRS used for a UL transmission related to PHICH, $N_{SF}^{PHICH}$ indicates a size of a spreading factor used for PHICH, $I_{PRB\_RA}^{lowest\_index}$ indicates a lowest PRB index of a UL resource allocation, and $N_{PHICH}^{group}$ indicates the number of PHICH group(s).

And, the $N_{PHICH}^{group}$ can be found by Formula 2 in the following.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$ [Formula 2]

In Formula 2, $N_g$ indicates information related to a size of PHICH resource represented as 2 bits ($N_g \in \{1/6, 1/2, 1, 2\}$) transmitted on PBCH (Physical Broadcast Channel and $N_{RB}^{DL}$ indicates the number of resource block(s) in DL.

Figure 14:
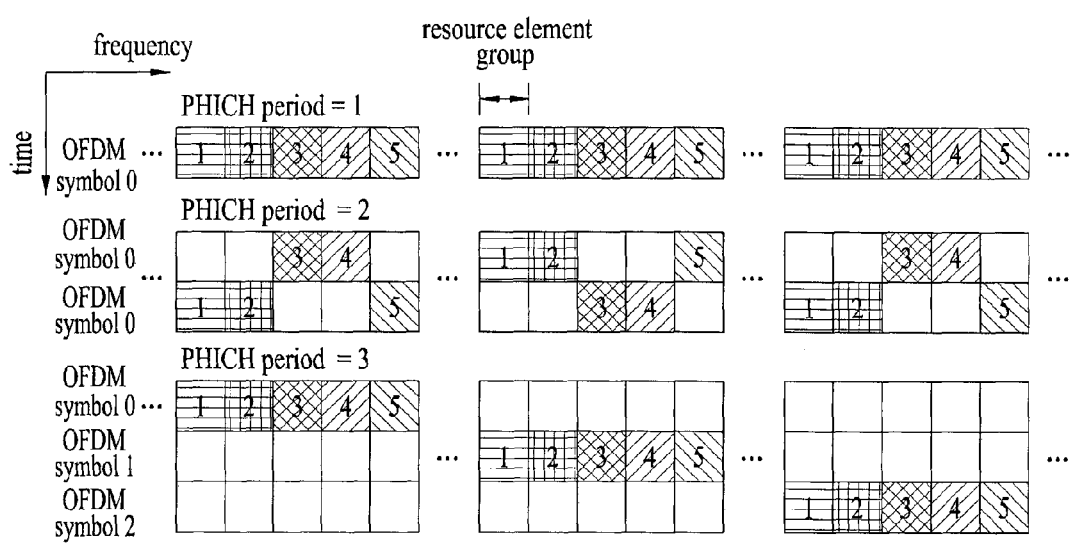
FIG. 14 is a diagram for one example of a configuration of PHICH group in a subframe in accordance with PHICH duration.

FIG. 14 is a diagram for one example of a configuration of PHICH group in a subframe in accordance with PHICH duration.

Referring to FIG. 14, a PHICH group may be configured with a different time region in a single subframe in accordance with PHICH duration {1, 2, 3}.

In the following description, PDCCH is explained in detail.

First of all, control information carried on PDCCH may be called downlink control information (DCI: downlink control indicator). The PDCCH has control information size and usage differing in accordance with DCI format and may have a size differing in accordance with a code rate.

Table 3 shows DCI in accordance with DCI format.

TABLE 3

| DCI format | Objectives |
|---|---|
| 0 | Scheduling of PUSCH |
| 1 | Scheduling of one PDSCH codeword |

TABLE 3-continued

| DCI format | Objectives |
| --- | --- |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |

Referring to Table 3, DCI formats may include a format 0 for PUSCH scheduling, a format 1 for scheduling of one PDSCH codeword, a format 1A for compact scheduling of one PDSCH codeword, a format 1C for very compact scheduling of DL-SCH, a format 2 for PDSCH scheduling in closed-loop spatial multiplexing mode, a format 2A for PDSCH scheduling in open-loop spatial multiplexing mode, a format 3 for a transmission of a TPC (transmission power control) command for a UL channel, and a format 3A for a transmission of a TPC (transmission power control) command for a UL channel. Moreover, a DCI format 1A is usable for PDSCH scheduling despite that any kind of transmission mode is set for a user equipment.

The DCI format may be independently applicable per user equipment and PDCCHs of several user equipments can be simultaneously multiplexed together within a single subframe. PDCCH is configured with aggregation of one or more contiguous CCEs (control channel elements). The CCE is a logical assignment unit used to provide the PDCCH with a code rate in accordance with a state of a radio channel. The CCE means a unit corresponding to 9 sets of REG configured with 4 resource elements. In order to configure a single PDCCH signal, a base station may be able to use CCEs, of which number belongs to {1, 2, 4, 8}. In this case, {1, 2, 4, 8} is called a CCE aggregation level. The number of CCEs used for a transmission of a specific PDCCH is determined by a base station in accordance with a channel state. PDCCH configured in accordance with each user equipment is mapped by the CCE-to-RE mapping rule in a manner of being interleaved into a control channel region of each subframe. A position of PDCCH may vary in accordance with the number of OFDM symbols for a control channel of each subframe, the number of PHICH group(s), a transmitting antenna, a frequency shift (cyclic shift) or the like.

As mentioned in the foregoing description, channel coding is independently performed on the multiplexed PDCCH of each user equipment and CRC (cyclic redundancy check) is then applied thereto. The CRC is masked with a unique ID of each user equipment (i.e., CRC), thereby enabling the corresponding user equipment to receive the PDCCH of its own. Yet, in a control region assigned within a subframe, a base station does not provide a user equipment of information indicating where a corresponding PDCCH is located. In order to receive a control channel transmitted from the base station, since the user equipment is unable to know that its PDCCH is transmitted at a specific location in a prescribed CCE aggregation level or DCI format, the user equipment searches for its PDCCH by monitoring a set of PDCCH candidates within the subframe. This is called a blind decoding (BD). This blind decoding may be called a blind detection or a blind search. According to the blind decoding, a user equipment damasks the CRC part from its UE ID (user equipment identifier) and then confirms whether the corresponding PDCCH is a control channel of the user equipment by checking CRC error.

In the following description, UL (uplink) retransmission is explained in detail.

First of all, a UL retransmission may be configured through the aforementioned PHICH and DCI format 0 (PUSCH scheduling). Synchronous non-adaptive retransmission is performed by receiving ACK/NACK via PHICH and a synchronous adaptive retransmission is performed through the DCI format 0. In particular, in both cases, the synchronous transmission is supported only. And, the synchronous retransmission indicates that a retransmission should be performed in a time given after a transmission of a $1^{st}$ packet.

In case of the non-adaptive retransmission of performing a retransmission on PHICH, the retransmission is performed by applying the same transmitting method in the same frequency resource (PRB) region of transmitting the $1^{st}$ packet. In case of the adaptive retransmission of performing a retransmission via the DCI format 0, the transmission may be performed by applying a frequency resource and a transmitting method in accordance with the corresponding scheduling information. In doing so, if a user equipment performs both PHIC scheduling and PUSCH scheduling simultaneously, a signal is transmitted in accordance with PUSCH scheduling information by ignoring PHICH. If NDI (new data indicator) in the PUSCH scheduling information is toggled, the user equipment compares it with a previous state, regards the previous packet transmission as successful, and then flushes a buffer. Yet, even if ACK is received on PHICH, if the NDI is not toggled, the user equipment maintains the buffer for the previous packet.

1. 3. Uplink System

As mentioned in the foregoing description, SC-FDMA scheme capable of efficient transmission by lowering PAPR (peak-to-average power ratio) or CM (cubic metric) and avoiding a non-linear distortion interval is used for a user equipment for which power efficiency is significant.

Figure 15:
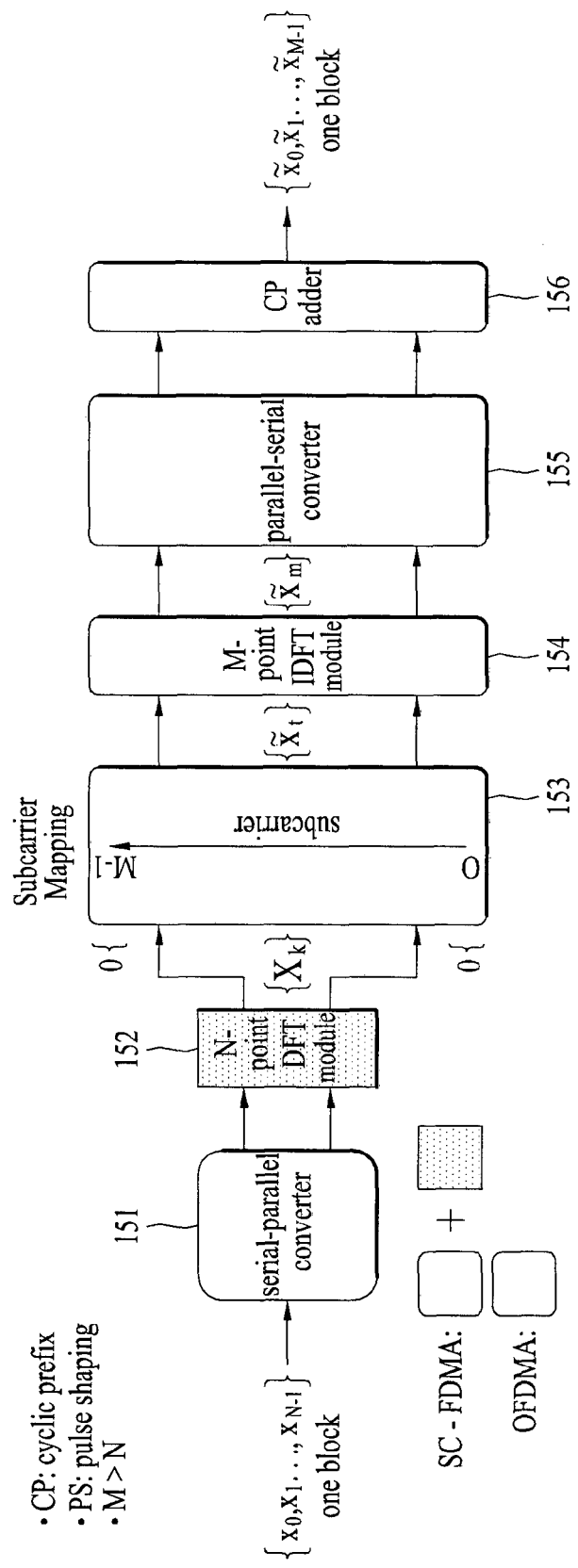
FIG. 15 is a diagram for comparing SC-FDMA scheme and OFDMA scheme to each other.

FIG. 15 is a diagram for comparing SC-FDMA scheme and OFDMA scheme to each other.

Referring to FIG. 15, a user equipment for a UL signal transmission and a base station for a DL signal transmission are identical to each other in including a serial-to-parallel converter 151, a subcarrier mapper 153, an M-point IDFT module 154 and a CP (cyclic prefix) adding module 156.

Yet, a user equipment for transmitting a signal by SC-FDMA scheme may additionally include an N-point DFT module 152. N data symbols generated from the serial-to-parallel converter 151 are inputted to the N-point DFT module 152. In doing so, the N data symbol components are spread over the assigned band. Subsequently, assuming that a band corresponding to N subcarriers are assigned to a user equipment, an output signal of the N-point DFT module 152 is mapped to an assigned position in a whole UL system band (i.e., an input of the M-point IDFT module). In particular, the N-point DFT module 152 enables a transmission signal to have a single carrier property by canceling out an IDFT processing effect of the M-point IDFT module 154.

FIG. 16 is a diagram for describing a signal mapping scheme in frequency domain to meet a single carrier property in the frequency domain.

FIG. 16 (a) shows a localized mapping scheme and FIG. 16 (b) shows a distributed mapping scheme. In particular, the localized mapping scheme is defined by 3GPP LTE system.

According to clustered SC-FDMA as a modified form of SC-FDMA, DFT process output samples in a subcarrier mapping process are divided into subgroups and the subgroups are discontinuously mapped to subcarrier regions, respectively, Occasionally, the clustered SC-FDMA may include a filtering process and a cyclic extension process. In this case, the subgroup may be named a cluster. And, the cyclic extension may mean that a guard interval longer than a maximum delay spread of a channel is inserted between contiguous symbols to prevent mutual inter-symbol interference (ISI) while each subcarrier symbol is carried on a multi-path channel.

Figure 17:
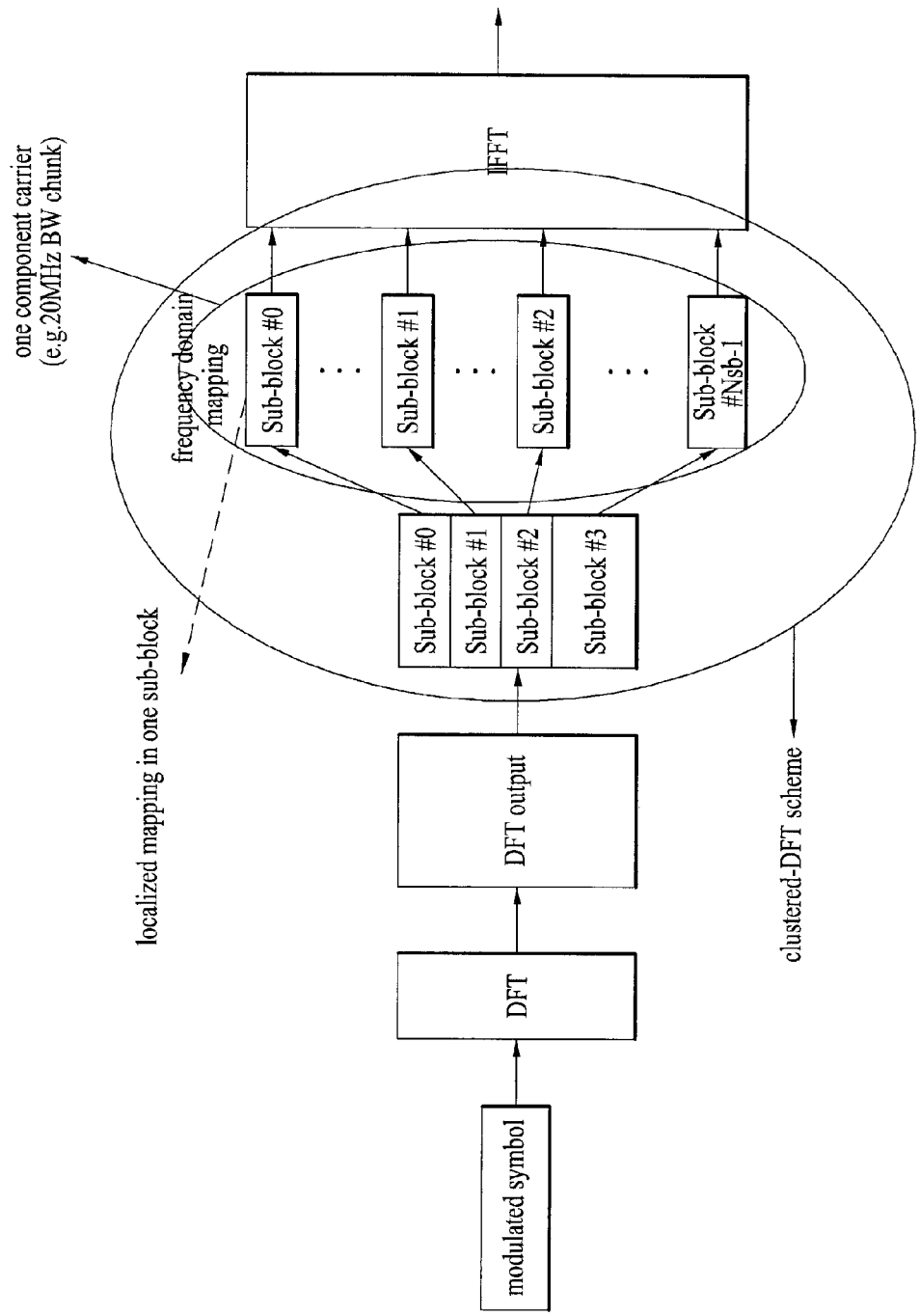
FIG. 17 is a diagram of a signal processing process for mapping DFT process output samples to a single carrier in clustered SC-FDMA.
Figure 18:
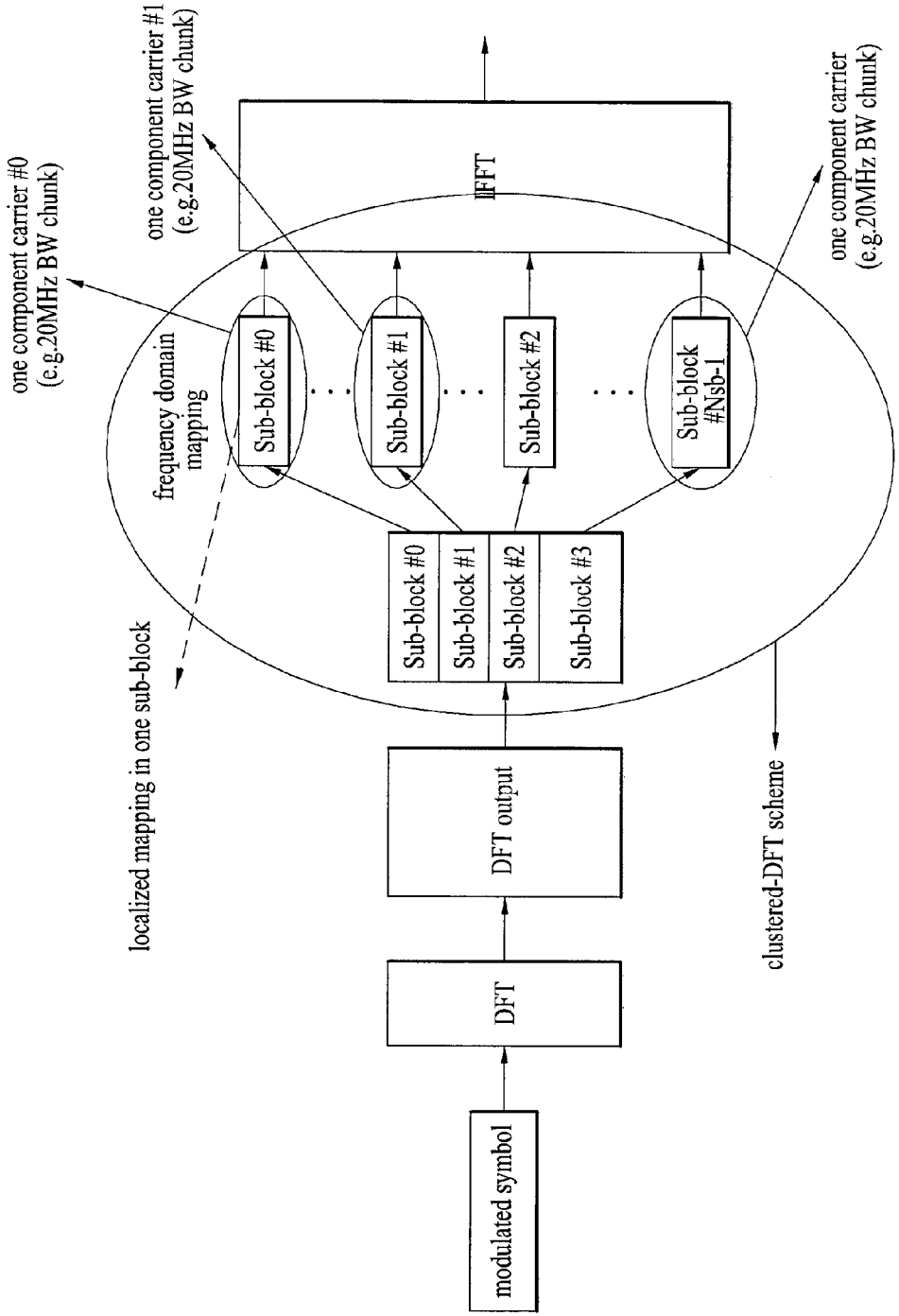
FIG. 18 and FIG. 19 are diagrams of a signal processing process for mapping DFT process output samples to a multicarrier in clustered SC-FDMA.
Figure 19:
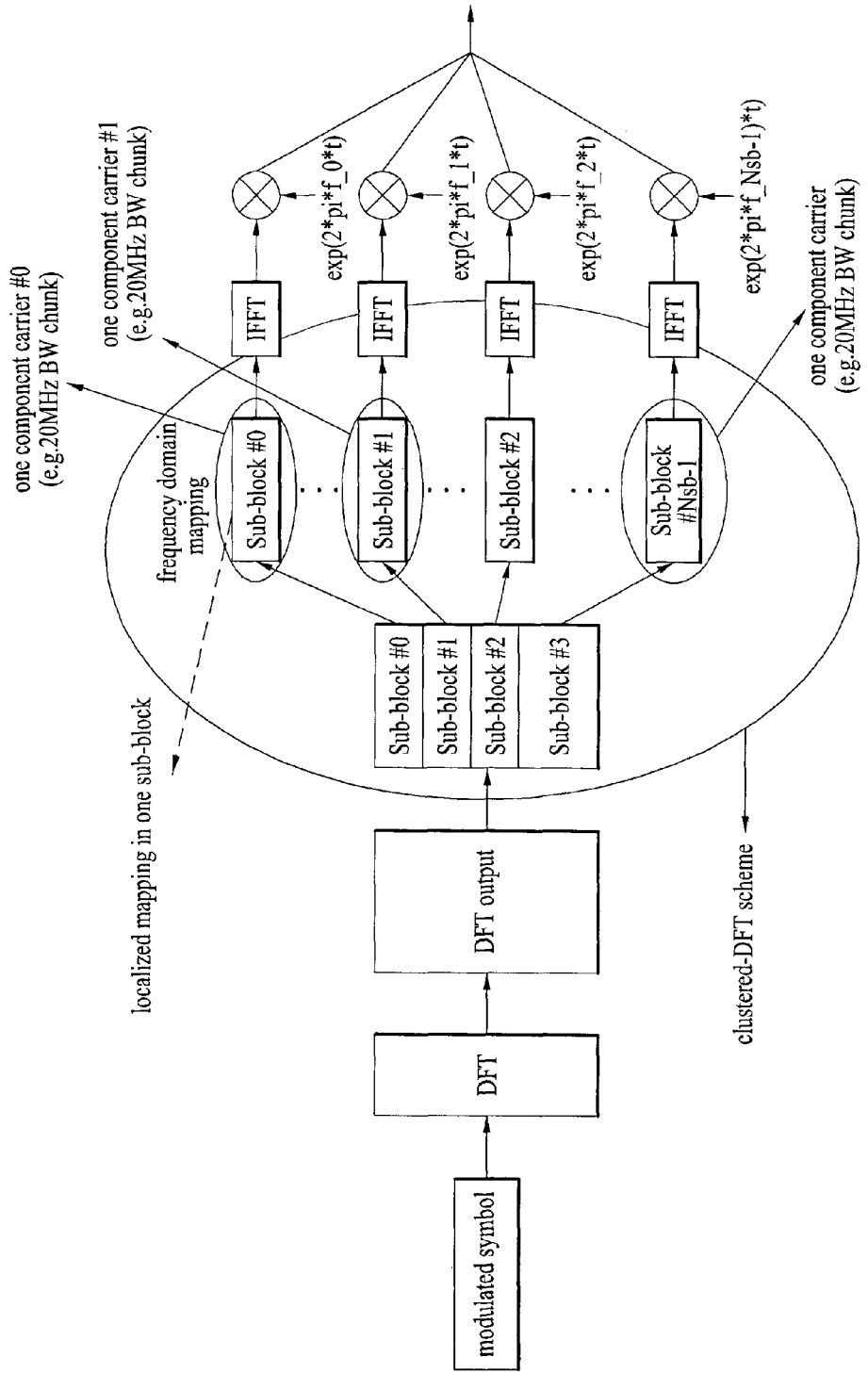

FIG. 17 is a diagram of a signal processing process for mapping DFT process output samples to a single carrier in the clustered SC-FDMA. FIG. 18 and FIG. 19 are diagrams of a signal processing process for mapping DFT process output samples to a multicarrier in the clustered SC-FDMA.

In particular, FIG. 17 shows an example of applying the clustered SC-FDMA in an intra-carrier and FIG. 18 and FIG. 19 show examples of applying the clustered SC-FDMA in an inter-carrier. Moreover, FIG. 18 shows a case of generating a signal via a single IFFT block if a subcarrier spacing between component carriers contiguous to each other is aligned in a situation that component carriers contiguous to each other are allocated in a frequency domain. And, FIG. 19 shows a case of generating a signal via a plurality of IFFT blocks because component carriers are not contiguous to each other in a situation that component carriers are non-contiguously allocated in a frequency domain.

The segmented SC-FDMA may simply extend a DFT spreading of the conventional SC-FDMA and a frequency subcarrier mapping configuration of IFFT because a configuration related between DFT and IFFT has a one-to-one relation by applying IFFTs of which number is equal to an arbitrary number of DFTs. This is called NxSCFDMA or NxDFT-s-OFDMA, which may be named segmented SC-FDMA for clarity of the following description.

Figure 20:
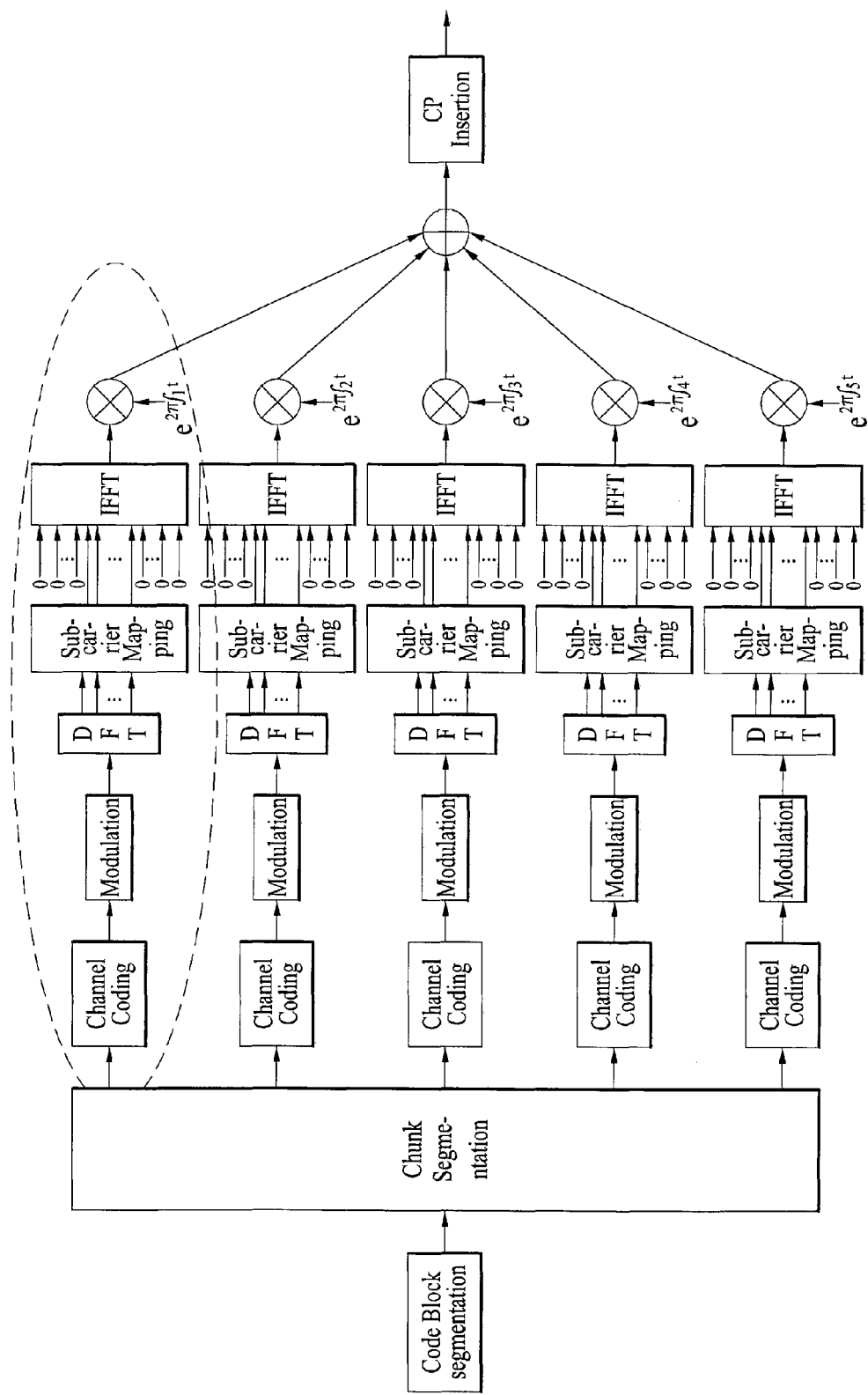
FIG. 20 is a diagram of a signal processing process in segmented SC-FDMA.

FIG. 20 is a diagram of a signal processing process in the segmented SC-FDMA.

Referring to FIG. 20, the segmented SC-FDMA may be characterized in performing a DFP process by a group unit in a manner of binding all time-domain modulated symbols into N groups (N is an integer greater than 1) to mitigate a single carrier property condition.

Figure 21:
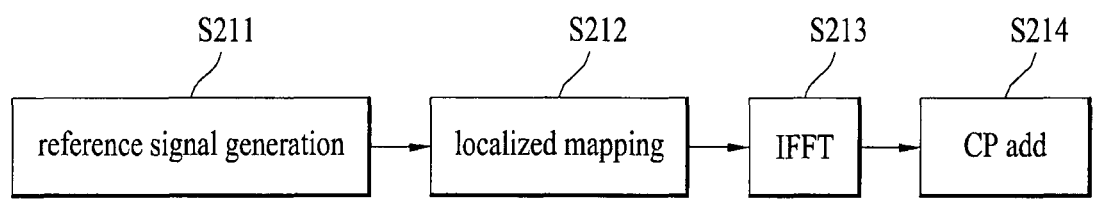
FIG. 21 is a diagram for describing a signal processing process for transmitting a reference signal in UL.

FIG. 21 is a diagram for describing a signal processing process for transmitting a reference signal in UL. Referring to FIG. 21, data is transmitted in a following manner. First of all, a signal is generated in time domain, transformed by a DFT precoder, mapped in frequency domain, and then transmitted via IFFT. Yet, a reference signal is directly generated in frequency domain by skipping a step of entering the DFT precoder. In particular, the reference signal is directly generated in the frequency domain [S211], undergoes a localized mapping step S212, an IFFT step S213 and a CP (cyclic prefix) attaching step S214 sequentially, and is then transmitted.

Figure 22:
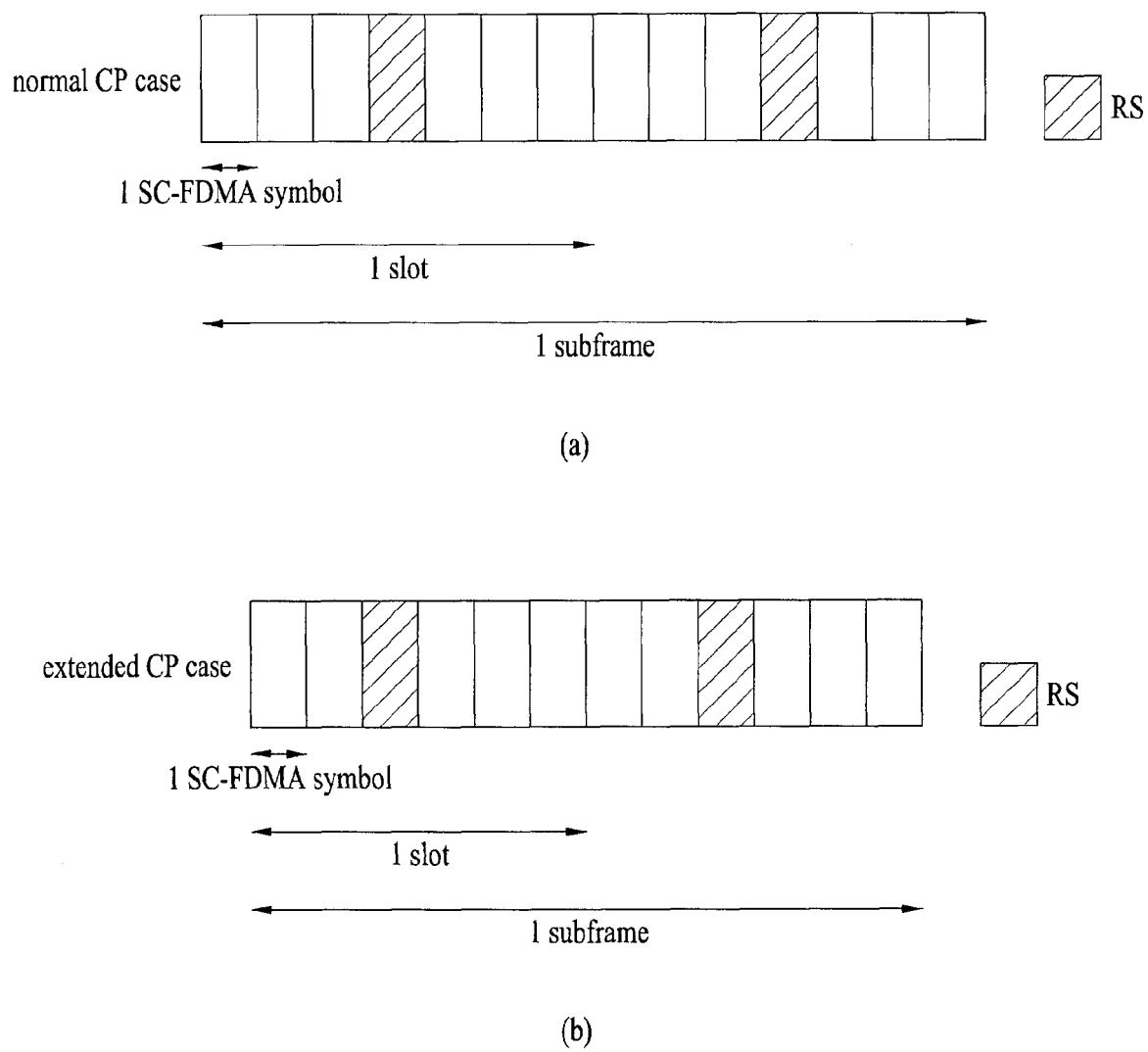
FIG. 22 is a diagram for a structure of a subframe to transmit a reference signal.

FIG. 22 is a diagram for structures of subframes to transmit reference signals.

FIG. 22 (a) shows a structure of a subframe to transmit a reference signal in case of a normal CP. And, FIG. 22 (b) shows a structure of a subframe to transmit a reference signal in case of an extended CP. Referring to FIG. 22 (a), a reference signal is carried on $4^{th}$ SC-FDMA symbol and $11^{th}$ SC-FDMA symbol. Referring to FIG. 22 (b), a reference signal is carried on $3^{rd}$ SC-FDMA symbol and $9^{th}$ SC-FDMA symbol.

2. Downlink Control Information (DCI) Transmitting Method

3GPP LTE-A system is a system extended from a legacy 3GPP LTE system in a manner of supporting a multicarrier environment, MU-MIMO (multi-user MIMO) technology and a technology of extension to a heterogeneous network including a relay, a femto cell, a hotzone cell and the like.

In the 3GPP LTE-A system, the above technologies have difficulty in using a legacy 3GPP LTE DL control channel in the same manner to obtain maximum performance. To settle this difficulty, an enhanced physical downlink control channel (e-PDCCH) may be introduced into the 3GPP LTE-A system to increase capacity of PDCCH of a legacy LTE system. The enhanced physical downlink control channel may be called an advanced physical downlink control channel (A-PDCCH) as well. For clarity of the following description, the enhanced/advanced physical downlink control channel shall be commonly named 'e-PDCCH' and a legacy physical downlink control channel shall be named 'legacy-PDCCH'. Moreover, in the following description, a user equipment of 3GPP LTE-A system (e.g., system over 'LTE Release-11') shall be named an enhanced user equipment (e-UE) and a user equipment of 3GPP LTE system (e.g., system under 'LTE Release-10') shall be named a legacy user equipment (legacy-UE).

As mentioned in the foregoing description, in case that e-PDCCH is introduced to increase the capacity of PDCCH, the e-PDCCH can be transmitted on a PDSCH region by being multiplexed with PDSCH.

Figure 23:
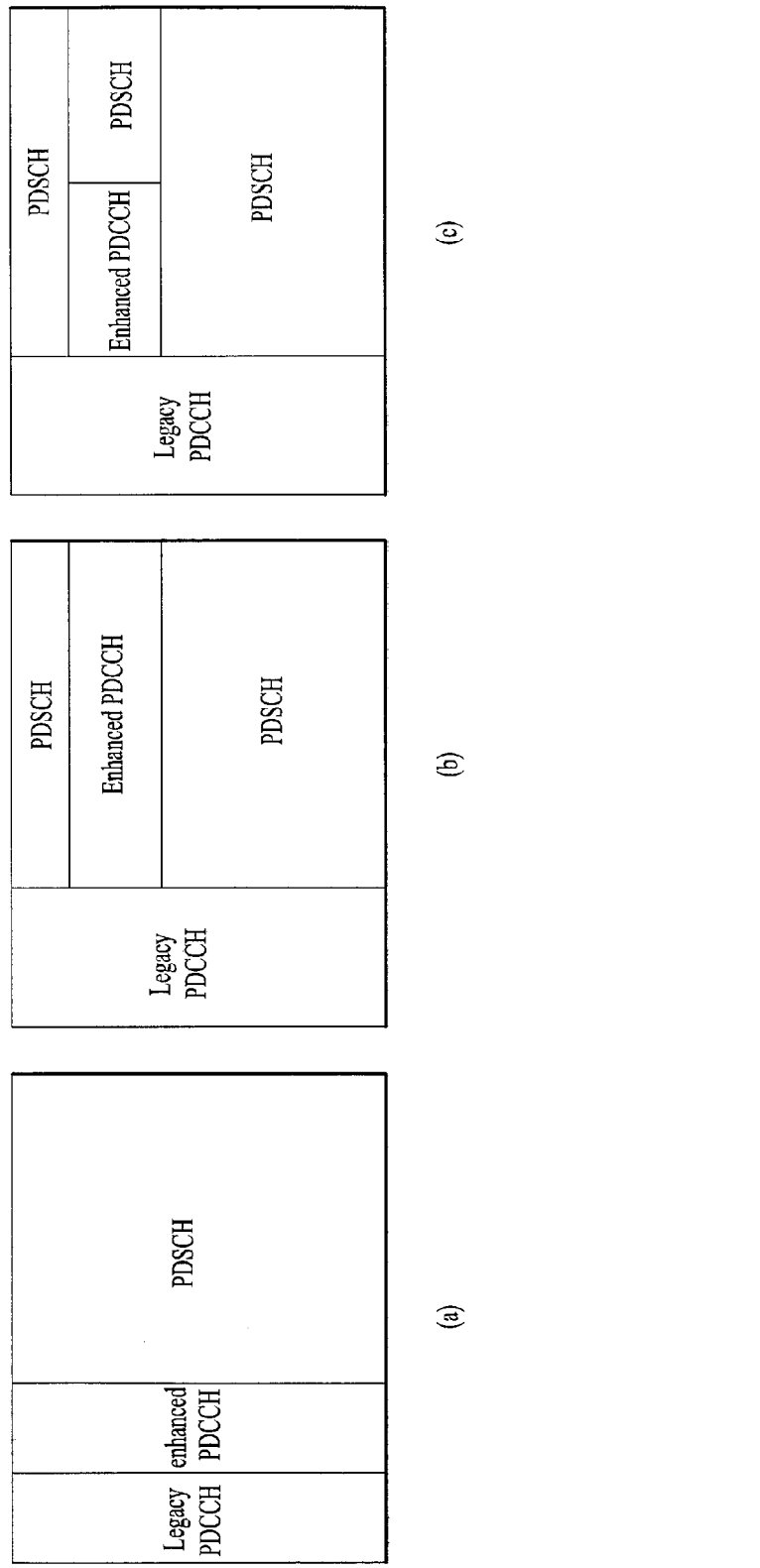
FIG. 23 is a diagram for a structure of e-PDCCH.

FIG. 23 is a diagram for a structure of e-PDCCH.

Referring to FIG. 23, FIG. 23 (a) shows a structure multiplexed with PDSCH by TDM (time division multiplex), FIG. 23 (b) shows a structure multiplexed with PDSCH by FDM (frequency division multiplex), and FIG. 23 (c) shows a structure multiplexed with PDSCH by FDM/TDM.

Yet, in case that e-PDCCH is transmitted by being multiplexed with PDSCH by TDM, since a legacy-UE is impacted in a normal subframe, the corresponding subframe should be set to MBSFN (multimedia broadcast single frequency network) subframe. On the other hand, in case that e-PDCCH is transmitted by being multiplexed with PDSCH by FDM or FDM/TDM, a transmission of e-PDCCH is possible without having an impact on the legacy-UE in the normal subframe. Thus, it may be able to design e-PDCCH in various ways in accordance with e-PDCCH multiplexing schemes.

Meanwhile, since the number of available DL symbols in case of DwPTS of a special subframe of TDD, is different that in case of a normal DL subframe, an e-PDCCH transmission designed with reference to a normal DL subframe may not be feasible. Moreover, whether e-PDCCH can be additionally transmitted on an extension component carrier (CC) on which PDCCH is not transmitted may raise an issue except a backward compatible component carrier compatible with a legacy system of transmitting PDCCH in general.

In the following description, a transmission scheme of DL control information (DCI) for a user equipment in TDD special subframe and a transmission scheme of DL control information on an extension CC are proposed. In the following description, assume that e-PDCCH mentioned in this specification uses one of the above-mentioned three kinds of the multiplexing schemes.

2. 1. Method of Transmitting Downlink Control Information (DCI) in Special Subframe Table 4 shows lengths of DwPTS, guard period and UpPTS in a special subframe.

| | Normal cyclic prefix in downlink | | | Extended cyclic prefix in downlink | | |
|---|---|---|---|---|---|---|
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Referring to Table 4 and FIG. 2 mentioned in the foregoing description, DL symbols, of which number is smaller than that of symbols in a normal DL subframe, are transmitted in DwPTS of a TDD special subframe. And, the number of the DL symbols transmitted in DwPTS varies in accordance with a special subframe configuration. Thus, in case of the special subframe of TDD, unlike the normal DL subframe, the number of DL symbols transmittable in DwPTS is variable in accordance with a configuration of the special subframe. Hence, a transmission of e-PDCCH may not be feasible in a special subframe in accordance with a design of e-PDSCH. For instance, in case of a normal cyclic prefix in accordance with a configuration of a special subframe, the number of DL symbols transmitted in DwPTS amounts to 3 symbols (e.g., configuration 0, configuration 5), 9 symbols (e.g., configuration 1, configuration 6), 10 symbols (e.g., configuration 2, configuration 7), 11 symbols (e.g., configuration 3, configuration 8), or 12 symbols (e.g., configuration 4) and the symbols less than symbols of a normal DL subframe are transmitted. Therefore, in case that a pure FDM based e-PDCCH transmission (cf. FIG. 23 (b)) is performed, a last symbol index of e-PDCCH may be changed in accordance with the configuration of the special subframe unlike the normal DL subframe. Moreover, the number of resource elements (REs) available for the e-PDCCH transmission within a single resource block (RB) becomes smaller than that of the normal DL subframe. This increases complexity in aspects of e-PDCCH design and blind decoding of a user equipment, which may not be preferable. In the following description, a scheme of transmitting DL control information in special subframe and a scheme for a user equipment to receive DL control information are explained in detail.

Particularly, in the following description, a base station may be able to transmit DCI by one of methods or a combination thereof.

2. 2. 1. Transmitting all DCIs on Legacy-PDCCH

In a special subframe of TDD system, a base station transmits all DCIs, which are transmitted for a user equipment in the corresponding subframe, on legacy-PDCCH only. In doing so, an e-EU set to receive DCI on e-PDCCH in a normal DL subframe or an e-UE set to perform a blind search on an e-PDCCH transmitting region to receive DCI in a normal DL subframe correspondingly performs a blind search on a legacy-PDCCH transmitting region in a special subframe only by ignoring the above setup.

In this case, all DCIs transmitted for the user equipment in the corresponding subframe can be transmitted on the legacy-PDCCH only in the special subframe for all special subframe configurations irrespective of the configuration of the special subframe. And, in a special subframe corresponding to a specific special subframe configuration only, all the DCIs transmitted for the user equipment in the corresponding subframe can be transmitted on the legacy-PDCCH only. In doing so, both of the base station and the user equipment may be previously aware of the information on the special subframe configuration for transmitting all the DCIs transmitted for the user equipment or the base station may inform the user equipment of this information by upper layer signaling.

2. 2. 2. Transmission in $1^{st}$ Slot of Special Subframe Only (Special Subframe Configurations 0 & 5 Excluded)

In case of the rest of special subframe configurations (e.g., configurations 1 to 4 and configurations 6 to 8) except special subframe configurations 0 and 5 in TDD system, a base station may be able to transmit e-PDCCH in a $1^{st}$ slot of a special subframe only. In case of the special subframe configurations 0 and 5, DL symbols less than symbols of the $1^{st}$ slot are transmitted in DwPTS. Hence, in case of the special subframe configurations 0 and 5, all DCIs transmitted for a user equipment in a corresponding subframe can be transmitted on legacy-PDCCH only. Information on a transmitting region of e-PDCCH may be known to both of the base station and the user equipment in advance. Alternatively, the base station may inform the user equipment of the information on the transmitting region of the e-PDCCH by upper layer signaling.

In this case, e-PDCCH can be transmitted in a $1^{st}$ slot of a special subframe only for all special subframe configurations except the cases of the special subframe configurations 0 and 5 irrespective of configurations of special subframes. Moreover, only if a special subframe corresponds to a specific special subframe configuration, e-PDCCH may be transmitted in a $1^{st}$ slot of the special subframe. In doing so, information on the special subframe configuration for transmitting the e-PDCCH in the $1^{st}$ slot only may be known to both of the base station and the user equipment in advance. Alternatively, the base station may inform the user equipment of the information on the special subframe configuration for transmitting the e-PDCCH in the $1^{st}$ slot only by upper layer signaling.

2. 2. 3. Transmission Up to Each End Symbol Per Special Subframe Configuration A base station may be able to transmit e-PDCCH by setting an end symbol (or a last symbol) of e-PDCCH transmission per special subframe configuration of TDD system to an end symbol (or a last symbol) of DwPTS in accordance with each special subframe configuration. In particular, in case of a special subframe configuration 1 or a special subframe configuration 6, an end symbol of e-PDCCH may be set to an OFDM symbol index 8 (i.e., $9^{th}$ symbol). In case of a special subframe configuration 2 or a special subframe configuration 7, an end symbol of e-PDCCH may be set to an OFDM symbol index 9 (i.e., $10^{th}$ symbol). In case of a special subframe configuration 3 or a special subframe configuration 8, an end symbol of e-PDCCH may be set to an OFDM symbol index 10 (i.e., $11^{th}$ symbol). And, in case of a special subframe configuration 4, an end symbol of e-PDCCH may be set to an OFDM symbol index 11 (i.e., $12^{th}$ symbol). Yet, in this case, in case of a special subframe configuration 0 or a special subframe configuration 5, all DCIs transmitted for a user equipment in a corresponding subframe can be transmitted on legacy-PDCCH only. Information on a transmitting region of e-PDCCH may be known to both of the base station and the user equipment in advance. Alternatively, the base station may inform the user equipment of the information on the transmitting region of the e-PDCCH by upper layer signaling.

In this case, e-PDCCH can be transmitted in a manner of setting the end symbol of DwPTS to the end symbol of e-PDCCH in a special subframe for all special subframe configurations except the cases of the special subframe configurations 0 and 5 irrespective of configurations of special subframes. Moreover, only if a special subframe corresponds to a specific special subframe configuration, e-PDCCH may be transmitted in the special subframe by setting the end symbol of DwPTS to the end symbol of e-PDCCH. In doing so, information on the special subframe configuration for transmitting the e-PDCCH by setting the end symbol of DwPTS to the end symbol of e-PDCCH may be known to both of the base station and the user equipment in advance. Alternatively, the base station may inform the user equipment of the information on the special subframe configuration for transmitting the e-PDCCH by setting the end symbol of DwPTS to the end symbol of e-PDCCH through upper layer signaling.

2. 2. Method of Transmitting DCI on Extension Component Carrier

Figure 24:
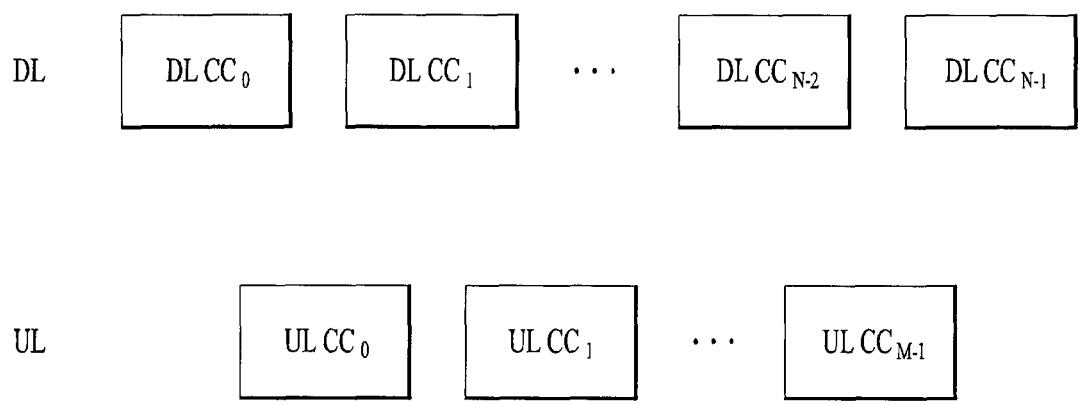
FIG. 24 is a diagram for conceptional configurations of basic DL and UL CCs allocated by a random cell, a base station or a relay node.

In LTE-A system, component carriers (CCs) configuring a downlink (DL) and an uplink (UL) for connection with a user equipment or a relay node in a cell area, a base station area or a relay node (RN) area may be represented as shown in FIG. 24.

FIG. 24 is a diagram for conceptional configurations of basic DL and UL CCs allocated by a random cell, a base station or a relay node.

Referring to FIG. 24, for example, the number of DL CCs is set to N and the number of UL CCS is set to M.

In LTE-A system, DL CCs can be mainly categorized into 3 kinds of types. In particular, there may exist a backward compatible CC compatible with a legacy system supportive of backward compatibility with the legacy system for LTE Release-8 user equipment, non-backward compatible CC inaccessible by the above-mentioned LTE user equipments, i.e., incompatible with a legacy system supportive of LTE-A user equipments only, an extension CC. The CC compatible with a legacy system may mean the CC that carries RS (reference signal) & P-SCH/S-SCH (primary sync channel/ secondary sync channel) and PBCH (physical broadcast channel) in accordance with LTE structure as well as PDCCH and PDSCH to enable an access by LTE user equipment. The CC incompatible with a legacy system means the CC that enables PDCCH, PDSCH, RS, P-SCH/S-SCH and PBCH transmissions in a manner of being transmitted in a modified form to disable an access by LTE user equipment. In case of the backward compatible CC, which is compatible with a legacy system, both the LTE user equipment and the LTE-A user equipment are accessible. In case of the non-backward compatible CC, which is not compatible with a legacy system, the LTE-A user equipment is accessible only. Each of the backward compatible CC and the non-backward compatible CC means the CC that enables a user equipment to access a cell through the corresponding CC. On the other hand, the extension CC means the CC through which a user equipment is not accessible and may indicate a supplementary CC of the backward compatible CC or the non-backward compatible CC. P-SCH/S-SCH, PBCH and PDCCH transmissions are not performed on the extension CC. All resources of the extension CC are used for PDSCH transmission of a user equipment. In particular, each of the backward compatible CC and the non-backward compatible CC may belong to a stand-alone CC type mandatory to form a single cell or capable of configuring a single cell. Yet, the extension CC, which should exist together with at least one stand-along CC, may belong to a non-standalone CC type.

Figure 25:
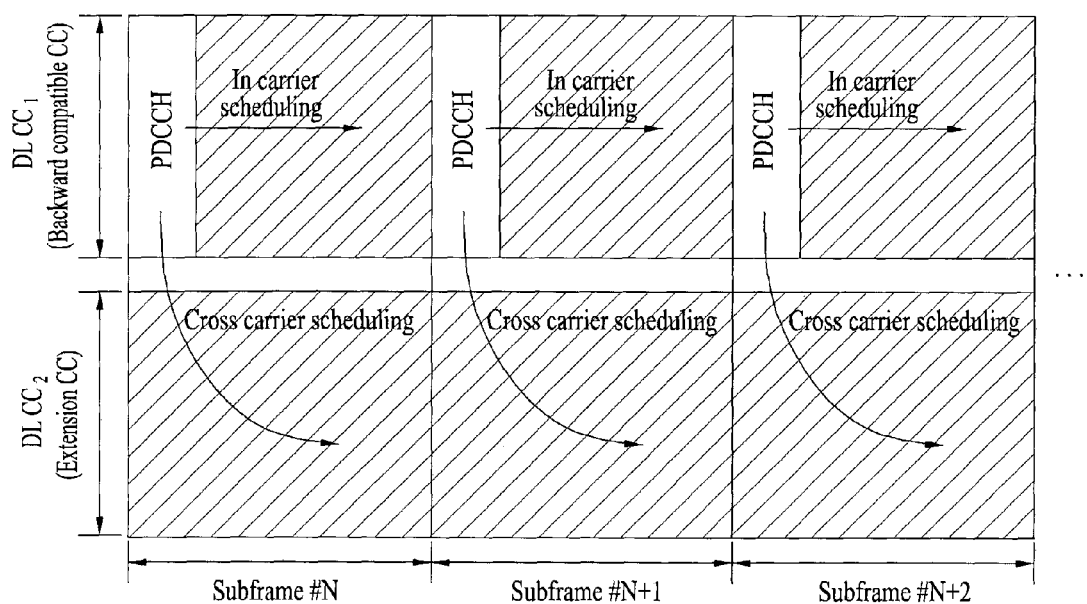
FIG. 25 is a diagram for one example of scheduling from one DL CC compatible with a legacy system to one extension DL CC.

FIG. 25 is a diagram for one example of scheduling from one DL CC compatible with a legacy system to one extension DL CC.

Referring to FIG. 25, if an extension CC is introduced, since such a downlink control channel as PDCCH for carrying scheduling information is not carried on the extension CC, the scheduling information is transmitted through cross carrier scheduling/cross cell scheduling from a stand-alone CC that carries the downlink control channel. In particular, if DL CC 1 is configured as a primary cell (PCell) for a random user equipment and DL CC 2 (i.e., extension CC) is configured as a secondary cell (SCell) for the random user equipment, scheduling information on PDSCH transmission of the corresponding DL CC 2 can be transmitted on PDCCH of the DL CC 1.

Yet, in case that DMRS (demodulation reference signal) based e-PDCCH transmission is performed on an extension CC, in-carrier scheduling may be applicable to the extension CC as well. Thus, in case that an e-PDCCH transmission is performed on an extension CC, the present invention proposes a method of transmitting downlink control information for the extension CC in a special subframe of a frame structure type 2 (TDD).

2. 3. 1. Transmission on Legacy-PDCCH/e-PDCCH of Stand-Alone Component Carrier (CC)

In case of a user equipment supportive of in-carrier scheduling for receiving DCI on e-PDCCH in a normal downlink subframe of an extension CC of a TDD system, a base station transmits the DCI by cross carrier scheduling on legacy-PDCCH or e-PDCCH of a stand-along CC (or a primary cell) in a special subframe. In particular, even if the in-carrier scheduling via e-PDCCH is set up for an extension CC, the user equipment is able to specifically operate in a cross carrier scheduling mode in a special subframe of TDD. In more particular, in dong so, a user equipment set to receive DCI on e-PDCCH within an extension CC in a normal DL subframe for the extension CC or user equipments set to perform a blind search on an e-PDCCH transmitting region within the extension CC to receive the DCI in the normal DL subframe may perform the blind search on a legacy-PDCCH or e-PDCCH transmitting region of a stand-alone CC (or a primary cell) in a special subframe by ignoring the corresponding setup. In doing so, information on the channel or region of carrying the DCI through the cross carrier scheduling may be known to both of the base station and the user equipment in advance. Alternatively, the base station may be able to inform the user equipment of the information on the channel or region of carrying the DCI through the cross carrier scheduling by upper layer signaling.

In this case, for configurations of all special subframes irrespective of a configuration of a special subframe, all DCIs transmitted for a user equipment on extension CC in the corresponding subframe may be transmitted on legacy-PDCCH or e-PDCCH of stand-alone CC (or primary cell). Moreover, only if a special subframe corresponds to a specific special subframe configuration, all DCIs transmitted for a user equipment on extension CC may be transmitted on legacy-PDCCH or e-PDCCH of stand-alone CC (or primary cell) in the corresponding subframe. In doing so, information on the special subframe configuration for transmitting all DCIs transmitted on the extension CC for the user equipment via the legacy-PDCCH or e-PDCCH of the stand-alone CC (or primary cell) may be known to both of the base station and the user equipment in advance. Alternatively, the base station may be able to inform the user equipment of the information on the special subframe configuration for transmitting all DCIs transmitted on the extension CC for the user equipment via the legacy-PDCCH or e-PDCCH of the stand-alone CC (or primary cell) by upper layer signaling.

2. 3. 2. Transmission to End Symbol Per Special Subframe Configuration Only

A base station may be able to transmit e-PDCCH in a manner of setting an end symbol of the e-PDCCH transmission in an extension CC per special subframe configuration of TDD system to an end symbol of DwPTS in accordance with each special subframe configuration. In particular, in case of a special subframe configuration 0 or a special subframe configuration 5, an end symbol of e-PDCCH in an extension CC is set to an OFDM symbol index 2 (e.g., $3^{rd}$ symbol). In case of a special subframe configuration 1 or a special subframe configuration 6, an end symbol of e-PDCCH in an extension CC is set to an OFDM symbol index 8 (e.g., $9^{th}$ symbol). In case of a special subframe configuration 2 or a special subframe configuration 7, an end symbol of e-PDCCH in an extension CC is set to an OFDM symbol index 9 (e.g., $10^{th}$ symbol). In case of a special subframe configuration 3 or a special subframe configuration 8, an end symbol of e-PDCCH in an extension CC is set to an OFDM symbol index 10 (e.g., $11^{th}$ symbol). In case of a special subframe configuration 4, an end symbol of e-PDCCH in an extension CC is set to an OFDM symbol index 11 (e.g., $12^{th}$ symbol). In doing so, information on an e-PDCCH transmitting region may be known to both of the base station and the user equipment in advance. Alternatively, the base station may be able to inform the user equipment of the information on the e-PDCCH transmitting region by upper layer signaling.

In this case, for configurations of all special subframes irrespective of a configuration of a special subframe, e-PDCH can be transmitted in the special subframe by setting the end symbol of e-PDCCH in the extension CC to the end symbol of DwPTS. Moreover, only if a special subframe corresponds to a specific special subframe configuration, e-PDDCH can be transmitted in the special subframe by setting the end symbol of e-PDCCH in the extension CC to the end symbol of DwPTS. In doing so, information on the special subframe configuration for transmitting the e-PDCCH by setting the end symbol of e-PDCCH in the extension CC to the end symbol of DwPTS may be known to both of the base station and the user equipment in advance. Alternatively, the base station may be able to inform the user equipment of the information on the special subframe configuration for transmitting the e-PDCCH by setting the end symbol of e-PDCCH in the extension CC to the end symbol of DwPTS by upper layer signaling.

Besides, as mentioned in the foregoing description of 2. 2. 2., in case of the rest (e.g., configurations 1 to 4 and configurations 4 to 8) of the special subframe configurations except the cases of the special subframe configuration 0 and the special subframe configuration 5, the 2-PDDCH may be transmitted in a $1^{st}$ slot of the special subframe only, of which details are omitted from the following description.

2. 3. 3. Legacy-PDCCH Transmission

A base station transmits e-PDCCH in a normal DL subframe of an extension CC of a TDD system, it may be able to transmit legacy-PDCCH in a special subframe for the extension CC of the TDD system only. In doing so, a base station transmits DCI in accordance with a previous legacy-PDCCH structure and may be able to transmit a legacy CRS in a corresponding special subframe only for PDCCH demodulation. Moreover, such CRS may be set to be transmitted in legacy-PDDCH region only. In particular, the CRS can be transmitted via a position corresponding to a legacy-PDDCH carried symbol only. Moreover, a non-precoded demodulation reference signal (DMRS) is transmitted on a legacy-PDCCH carried symbol (e.g., first 2 symbols of a $1^{st}$ slot) of a special subframe to enable a user equipment to demodulate legacy-PDCCH using DMRS. In this case, a position of a DMRS transmitted frequency may follow a position of a previous DMRS transmitted frequency. For instance, transmission may be performed at a previous DMRS transmitted frequency position in last 2 symbols of each slot.

For an extension CC, legacy-PDDCH is transmitted in a special subframe. Hence, in a user equipment performing a cross carrier scheduling, a start symbol of PDSCH of the corresponding special subframe may vary by depending on a size of the legacy-PDCCH. Therefore, information on the start symbol of the PDSCH in downlink resource allocation information (DL grant) of DCI can be transmitted in the special subframe. In particular, a start symbol position (or index) of the corresponding PDSCH can be transmitted together with the downlink resource allocation information on the PDSCH of the special subframe within the extension CC in the PDSCH or e-PDCCH of the stand-alone CC (or primary cell) for performing cross-scheduling on the PDSCH of the special subframe within the extension CC. Moreover, a user equipment can be informed of the information on the start symbol position of the PDSCH of the special subframe within the extension CC via the upper layer signaling.

Meanwhile, for configurations of all special subframes irrespective of a configuration of a special subframe, the legacy-PDDCH can be transmitted in the special subframe within the extension CC. Moreover, only if a special subframe corresponds to a specific special subframe configuration, the legacy-PDDCH can be transmitted in the special subframe within the extension CC. In doing so, information on the special subframe configuration for transmitting the legacy-PDCCH in the special subframe within the extension CC may be known to both of the base station and the user equipment in advance. Alternatively, the base station may be able to inform the user equipment of the information on the special subframe configuration for transmitting the legacy-PDCCH in the special subframe within the extension CC by upper layer signaling.

3. The General of Device for Implementing the Present Invention

Figure 26:
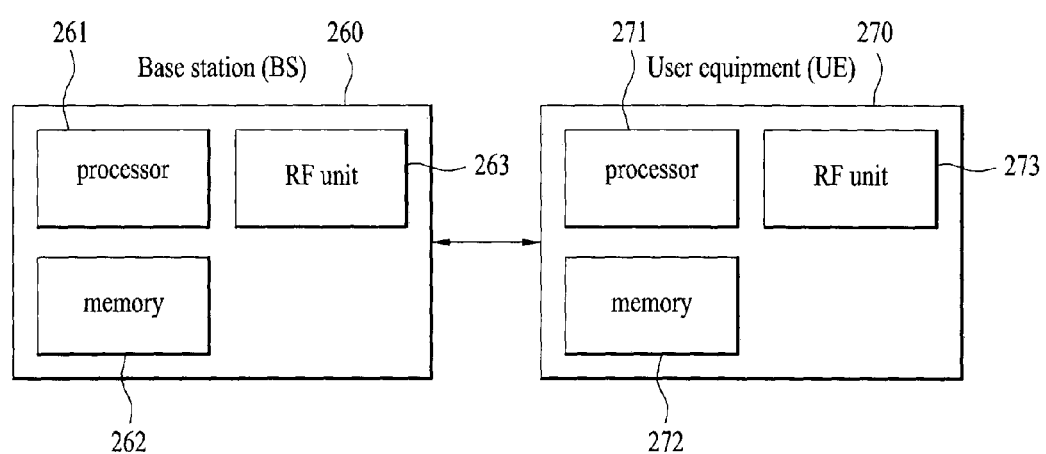
FIG. 26 is a block diagram for a configuration of a wireless communication device according to one embodiment of the present invention.

FIG. 26 is a block diagram for a configuration of a wireless communication device according to one embodiment of the present invention.

Referring to FIG. 26, a wireless communication system may include a base station BS 260 and a plurality of user equipments UEs 270 located within an area of the base station 260. In this case, the user equipments UE 270 may include both of the legacy-UE and the e-UE mentioned in the foregoing description.

The base station 260 may include a processor 261, a memory 262 and an RF (radio frequency) unit 263. The processor 261 implements the proposed functions, processes and/or methods. Layers of a radio interface protocol can be implemented by the processor 261. The memory 262 is connected with the processor 261 and then stores various kinds of information to drive the processor 261. The RF unit 263 is connected with the processor 261 and then transmits and/or receives radio signals.

The user equipment 270 includes a processor 271, a memory 272 and an RF unit 273. The processor 271 implements the proposed functions, processes and/or methods. Layers of a radio interface protocol can be implemented by the processor 271. The memory 272 is connected with the processor 271 and then stores various kinds of information to drive the processor 271. The RF unit 273 is connected with the processor 271 and then transmits and/or receives radio signals.

The memory 262/272 may be provided within or outside the processor 261/271. And, the memory 262/272 may be connected with the processor 261/271 via various kinds of well-known means. Moreover, the base station 260 and/or the user equipment 270 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Although a data transceiving method in a wireless access system according to the present invention is described with reference to examples applied to 3GPP LTE system, it may be applicable to various kinds of wireless access systems as well as the 3GPP LTE system.

What is claimed is:

1. A method of receiving DCI (downlink control information) in a TDD (time division duplex) wireless access system, comprising the steps of:
    performing a blind decoding on a transmitting region of an e-PDCCH (enhanced physical downlink control channel) transmitted by being multiplexed with a PDSCH (physical downlink shared channel); and
    receiving the DCI through the blind decoding of the e-PDCCH,
    wherein a last symbol of the transmitting region of the e-PDCCH in a special subframe is configured in accordance with a configuration of the special subframe, and when the configuration of the special subframe is 1 to 4 and 6 to 8, the last symbol of the transmitting region of the e-PDCCH in the special subframe is configured as a last symbol in a first slot of the special subframe.

2. The method of claim 1, wherein the DCI is transmitted on an extension component carrier in a carrier aggregation supportive wireless access system.

3. The method of claim 2, wherein in case of the special subframe, the DCI is transmitted on PDCCH (physical downlink control channel) or e-PDCCH of a component carrier performing cross carrier scheduling.

4. A user equipment, which receives DCI (downlink control information) in a TDD (time division duplex) wireless access system, comprising:
    an RF (radio frequency) unit configured to transmit and receive a radio signal; and
    a processor configured to control the RF unit, the processor further configured to perform a blind decoding on a transmitting region of an e-PDCCH (enhanced physical downlink control channel) transmitted by being multiplexed with a PDSCH (physical downlink shared channel), and receive the DCI through the blind decoding of the e-PDCCH, wherein a last symbol of the transmitting region of the e-PDCCH in a special subframe is configured in accordance with a configuration of the special subframe, and when the configuration of the special subframe is 1 to 4 and 6 to 8, the last symbol of the transmitting region of the e-PDCCH in the special subframe is configured as a last symbol in a first slot of the special subframe.

5. The user equipment of claim 4, wherein the DCI is transmitted on an extension component carrier in a carrier aggregation supportive wireless access system.

6. The user equipment of claim 5, wherein in case of the special subframe, the DCI is transmitted on PDCCH (physical downlink control channel) or e-PDCCH of a component carrier performing cross carrier scheduling.

* * * * *